(12) United States Patent
Kukal et al.

(10) Patent No.: US 10,289,793 B1
(45) Date of Patent: May 14, 2019

(54) SYSTEM AND METHOD TO GENERATE SCHEMATICS FROM LAYOUT-FABRICS WITH A COMMON CROSS-FABRIC MODEL

(71) Applicant: Cadence Design Systems, Inc., San Jose, CA (US)

(72) Inventors: Taranjit Singh Kukal, Delhi (IN); Arnold Jean Marie Gustave Ginetti, Antibes (FR); Steven Roberts Durrill, Campbell, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 89 days.

(21) Appl. No.: 15/445,002

(22) Filed: Feb. 28, 2017

(51) Int. Cl.
*G06F 17/50* (2006.01)

(52) U.S. Cl.
CPC ...... *G06F 17/5077* (2013.01); *G06F 17/5081* (2013.01)

(58) Field of Classification Search
CPC ............. G06F 17/5036; G06F 2217/40; G06F 17/5081; G06F 17/5068; G06F 2217/82; G06F 17/5009; G06F 17/5045; G06F 17/5077
USPC .............. 716/115, 118–119, 137; 703/13–14
See application file for complete search history.

(56) References Cited

U.S. PATENT DOCUMENTS

| | | | | |
|---|---|---|---|---|
| 6,106,567 | A * | 8/2000 | Grobman | G06F 17/5036 703/14 |
| 8,640,077 | B1 * | 1/2014 | Groves | G06F 17/5036 716/100 |
| 9,881,119 | B1 * | 1/2018 | Kukal | G06F 17/5036 |
| 9,881,120 | B1 * | 1/2018 | Ginetti | G06F 17/5081 |

* cited by examiner

*Primary Examiner* — Nghia M Doan
(74) *Attorney, Agent, or Firm* — Mark H. Whittenberger, Esq.; Holland & Knight LLP

(57) ABSTRACT

Embodiments include herein are directed towards a method for use in an electronic design environment is provided. The method may include receiving, using a processor, a parent fabric corresponding to a top layout fabric associated with an electronic design and receiving a child fabric corresponding to a child layout fabric associated with the electronic design. The method may further include receiving an electromagnetic ("EM") model that represents one or more cross-fabric geometries associated with the electronic design and generating a hierarchical schematic representing each layout fabric, wherein the EM model is inserted into a parent schematic. The method may also include managing one or more interface connections between the hierarchical schematic.

20 Claims, 43 Drawing Sheets

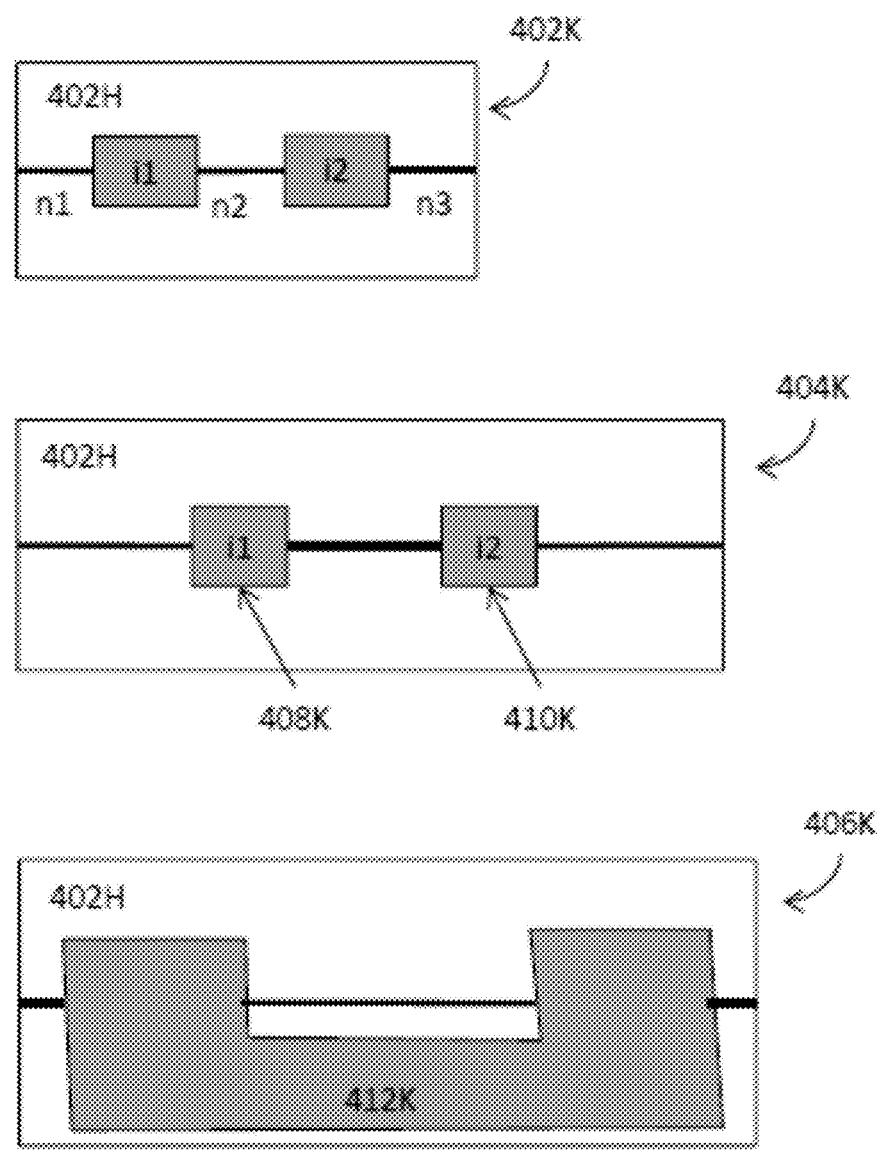

```
PCB_Package-Model
# Child-refdes in Parent-fabric for U1: BGA1
! Port 1 = U1-2     pcb_neta
! Port 2 = IC1-210  pcb_neta; BGA1-11 pkg_neta
! Port 3 = U1-4     pcb_netb
! Port 4 = IC1-310  pcb_netb; BGA1-13 pkg_netb
}

! Port 5 =          NULL;     U11-210 netx
! Port 6 =          NULL;     U12-310 nety Embedded_components: BGA1; L1
```

FIG. 20

```
PCB_Package-Model
# Child-refdes in Parent-fabric for U1: BGA1
| Port 1 = U1-2     pcb_neta
| Port 2 = IC1-210 pcb_neta; BGA1-11 pkg_neta
| Port 3 = U1-4     pcb_netb
| Port 4 = IC1-310 pcb_netb; BGA1-13 pkg_netb
{

| Port 5 =          NULL;    U11-210 netx
| Port 6 =          NULL;    U12-310 nety Embedded_components: BGA1; L1
```

FIG. 21

```
PCB_Package-Model
# Child-refdes in Parent-fabric for U1: BGA1
| Port 1 = U1-2    pcb_neta
| Port 2 = IC1-210 pcb_neta; BGA1-11 pkg_neta
| Port 3 = U1-4    pcb_netb
| Port 4 = IC1-310 pcb_netb; BGA1-13 pkg_netb

| Port 5 =         NULL;     U11-210 netx
| Port 6 =         NULL;     U12-310 nety Embedded_components: BGA1; L1
```

FIG. 22

```
PCB_Package-Model
# Child-refdes in Parent-fabric for U1: BGA1
| Port 1 = U1-2      pcb_neta
| Port 2 = IC1-210  pcb_neta; BGA1-11 pkg_neta
| Port 3 = U1-4      pcb_netb
| Port 4 = IC1-310  pcb_netb; BGA1-13 pkg_netb
|

| Port 5 =          NULL;      U11-210 netx
| Port 6 =          NULL;      U12-310 nety Embedded_components: BGA1; L1
```

FIG. 23

```
PCB_Package-Model
# Child-refdes in Parent-fabric for U1: BGA1
| Port 1 = U1-2      pcb_neta
| Port 2 = IC1-210 pcb_neta: BGA1-11 pkg_neta
| Port 3 = U1-4      pcb_netb
| Port 4 = IC1-310 pcb_netb: BGA1-13 pkg_netb
{

| Port 5 =          NULL:        U11-210 netx
| Port 6 =          NULL:        U12-310 nety Embedded_components: BGA1: L1
```

FIG. 24

SYSTEM AND METHOD TO GENERATE SCHEMATICS FROM LAYOUT-FABRICS WITH A COMMON CROSS-FABRIC MODEL

BACKGROUND

Design engineers may often desire to simulate an IC (integrated circuit) design within the context of a system design that spans across the IC design fabric, the package design fabric, and PCB (printed circuit board) design fabric. The schematics of PCB and package may not always exist at the time of simulation. Even if the schematics of PCB and package do exist at the time of simulation, these schematics may be available in different formats for different schematic tools. As a result, these schematics may be incompatible with each other and thus cannot be simulated together without translation, transformation, compilation, etc. (collectively "transformation").

In addition, design engineers may desire to simulate this system design within the context of parasitics of the chip layout, the package layout, and the PCB layout. The parasitic-models may be extracted as combined geometries across multiple design fabrics. Some examples of such models may include on-chip spiral inductor extracted in conjunction with the package planes and traces. In some cases, complete PCB (or package) may be extracted as a single parasitic model that needs to connect to the remainder of the system. Nonetheless, it is very difficult to include parasitics from different design fabrics (e.g., different design fabrics in various layouts) in the simulation schematic.

Conventional approaches require manual creation of parasitic aware simulation schematics where a new schematic is manually created where PCB and package components are stitched into the IC schematic to create the simulation schematic. On the other hand, if PCB/package schematics are available in their native schematic editors, the user needs to copy the same schematics in the IC schematic entry tool. In some cases, if PCB/package schematics do not exist, the user has to construct new schematic by going through respective layouts to obtain the connectivity.

In some cases, it may be necessary to stitch a cross-fabric electromagnetic ("EM") model into schematics where each schematic represents a different fabric. In order to capture coupling effects, an element on a layout fabric should be EM-extracted in conjunction with other layout-fabrics that surround this fabric. An EM model extracted from a multi-fabric combined geometry needs to be stitched to all fabric schematics such that all schematics can connect to the common multi-fabric model. When a common multi-fabric EM-model stitches into multiple schematics, it is important that the devices that are part of the EM-model are removed from the schematic to avoid double counting.

SUMMARY

In one or more embodiments of the present disclosure, a computer-implemented method for use in an electronic design environment is provided. The method may include receiving, using a processor, a parent fabric corresponding to a top layout fabric associated with an electronic design and receiving a child fabric corresponding to a child layout fabric associated with the electronic design. The method may further include receiving an electromagnetic ("EM") model that represents one or more cross-fabric geometries associated with the electronic design and generating a hierarchical schematic representing each layout fabric, wherein the EM model is inserted into a parent schematic. The method may also include managing one or more interface connections between the hierarchical schematic.

One or more of the following features may be included. The parent fabric may be a printed-circuit board ("PCB"). The child fabric may be a package model. In some embodiments, generating the hierarchical schematic may include reading the top layout fabric and the child layout fabric to determine connectivity data associated with each and one or more models of layout traces. The method may further include reading the EM model, wherein reading the EM model includes identifying one or more parent nets to be used for abutting nets in the parent schematic. In some embodiments, reading the EM model may include identifying one or more child nets to be used for abutting nets in a child schematic. In some embodiments, reading the EM model may include identifying a parent instance mapping to a child reference designator. Reading the EM model may include identifying the one or more parent nets that are shorted to the one or more child nets as interfaces.

In one or more embodiments of the present disclosure a computer-readable storage medium having stored thereon instructions, which when executed by a processor result in one or more operations is provided. Operations may include receiving, using a processor, a parent fabric corresponding to a top layout fabric associated with an electronic design and receiving a child fabric corresponding to a child layout fabric associated with the electronic design. Operations may further include receiving an electromagnetic ("EM") model that represents one or more cross-fabric geometries associated with the electronic design and generating a hierarchical schematic representing each layout fabric, wherein the EM model is inserted into a parent schematic. Operations may also include managing one or more interface connections between the hierarchical schematic.

One or more of the following features may be included. The parent fabric may be a printed-circuit board ("PCB"). The child fabric may be a package model. In some embodiments, generating the hierarchical schematic may include reading the top layout fabric and the child layout fabric to determine connectivity data associated with each and one or more models of layout traces. Operations may further include reading the EM model, wherein reading the EM model includes identifying one or more parent nets to be used for abutting nets in the parent schematic. In some embodiments, reading the EM model may include identifying one or more child nets to be used for abutting nets in a child schematic. In some embodiments, reading the EM model may include identifying a parent instance mapping to a child reference designator. Reading the EM model may include identifying the one or more parent nets that are shorted to the one or more child nets as interfaces.

In one or more embodiments of the present disclosure, a system for use in an electronic design environment is provided. The system may include at least one processor configured to receive a parent fabric corresponding to a top layout fabric associated with an electronic design, a child fabric corresponding to a child layout fabric associated with the electronic design, and an electromagnetic ("EM") model that represents one or more cross-fabric geometries. The at least one processor may be further configured to generate a hierarchical schematic representing each layout fabric, wherein the EM model is inserted into a parent schematic. The at least one processor may be further configured to manage one or more interface connections between the hierarchical schematic.

One or more of the following features may be included. In some embodiments, generating the hierarchical schematic may include reading the top layout fabric and the child layout fabric to determine connectivity data associated with each and one or more models of layout traces. The at least one processor may be further configured to read the EM model, wherein reading the EM model includes identifying one or more parent nets to be used for abutting nets in the parent schematic and identifying one or more child nets to be used for abutting nets in a child schematic. In some embodiments, reading the EM model may further include identifying a parent instance mapping to a child reference designator and identifying the one or more parent nets that are shorted to the one or more child nets as interfaces.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 4H-L illustrate some examples of extraction of circuit elements and representation of circuit elements in one or more extracted models in one or more embodiments.

FIG. 20 illustrates a diagram consistent with one or more embodiments of the schematic generation process described herein.

FIG. 21 illustrates a diagram consistent with one or more embodiments of the schematic generation process described herein.

FIG. 22 illustrates a diagram consistent with one or more embodiments of the schematic generation process described herein.

FIG. 23 illustrates a diagram consistent with one or more embodiments of the schematic generation process described herein.

FIG. 24 illustrates a diagram consistent with one or more embodiments of the schematic generation process described herein.

DETAILED DESCRIPTION

Figure 1A:
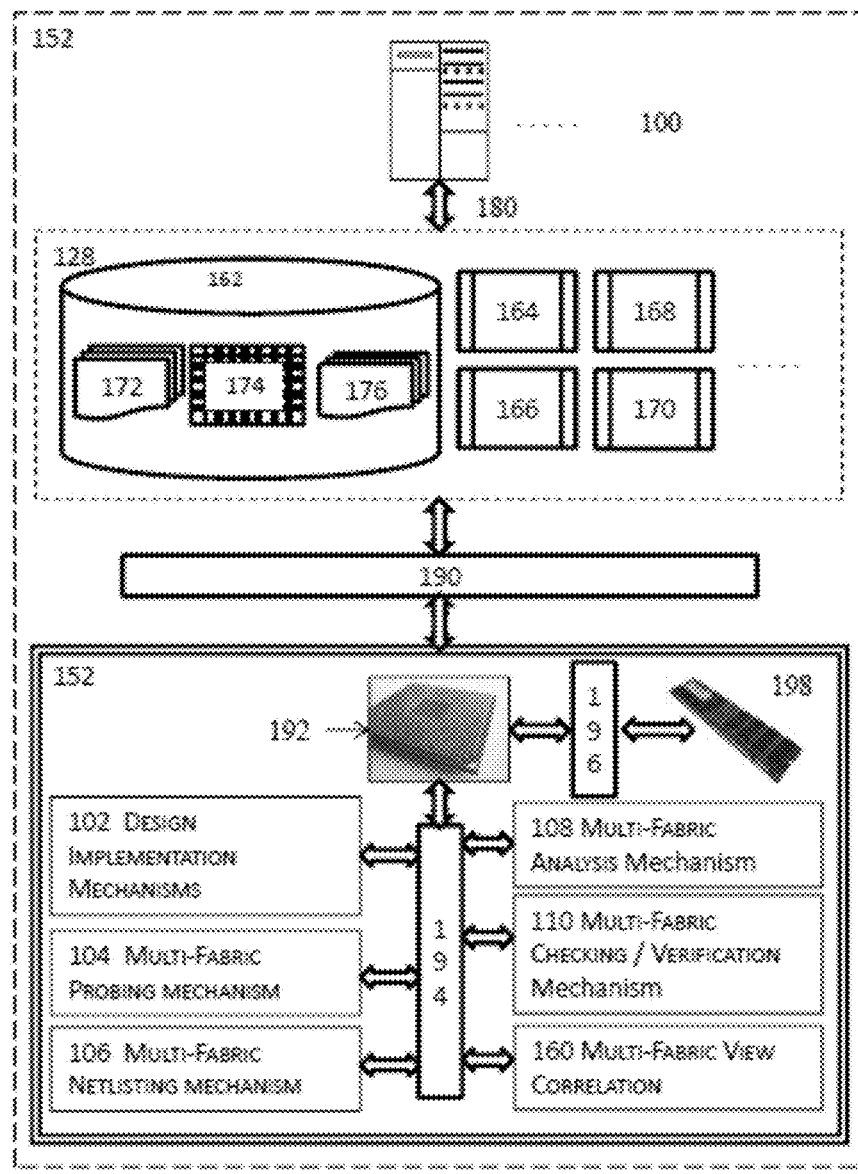
FIG. 1A illustrates a high level schematic block diagrams for constructing a simulation schematic of an electronic design across multiple design fabrics in one or more embodiments.

Various embodiments are directed to a method, system, and computer program product for generating schematics from layout-fabrics with a common cross-fabric model in an electronic design. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-27.

Some embodiments described herein are directed at an apparatus and method that automatically read an electronic design (e.g., a schematic or layout of a system design) and automatically generate a simulation schematic. Some other embodiments described herein are directed at an apparatus and method that identify extracted models of one or more portions of an electronic design and automatically insert these extracted models as schematic components in the simulation schematic and replace the design components that are part of the extracted models with the extracted models.

One of the advantages of these techniques described herein is the that the designers no longer need to reconstruct the PCB and package design schematics around the IC chip design, and these techniques thus provide a net saving in time and effort. Another advantage is that connectivity information may be automatically extracted from various schematics and/or layouts without or with little human intervention even in the absence of the PCB schematic or the IC package design schematic. Some other embodiments are directed at an apparatus and a method that construct a parasitic aware simulation schematic from layouts across design fabrics (e.g., IC design fabric, IC package design fabric, PCB design fabric, etc.)

Another advantage of some techniques described herein is that the parasitic models extracted from various layouts may be automatically inserted in a simulation schematic without or with little human intervention. Another advantage is that a designer no longer needs to keep track of design components that have been included in a parasitic model and thus needs to be removed from the system schematic. Another advantage is that when one logical interface is distributed over multiple pins (e.g., an interface having five pins that are connected to $V_{DD}$), the interconnection between the logical interface and the multiple pins may be automatically furnished.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high level schematic block diagrams for constructing a simulation schematic of an electronic design across multiple design fabrics in one or more embodiments. More specifically, FIG. 1A illustrates an illustrative high level schematic block diagrams for constructing a simulation schematic of an electronic design across multiple design fabrics and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics.

The set of mechanisms 152 may further optionally include one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules 160 to correlate various symbolic views, schematic views, and/or layout views with the schematic design data or the layout data in different design fabrics at various hierarchical levels, etc.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 1B:
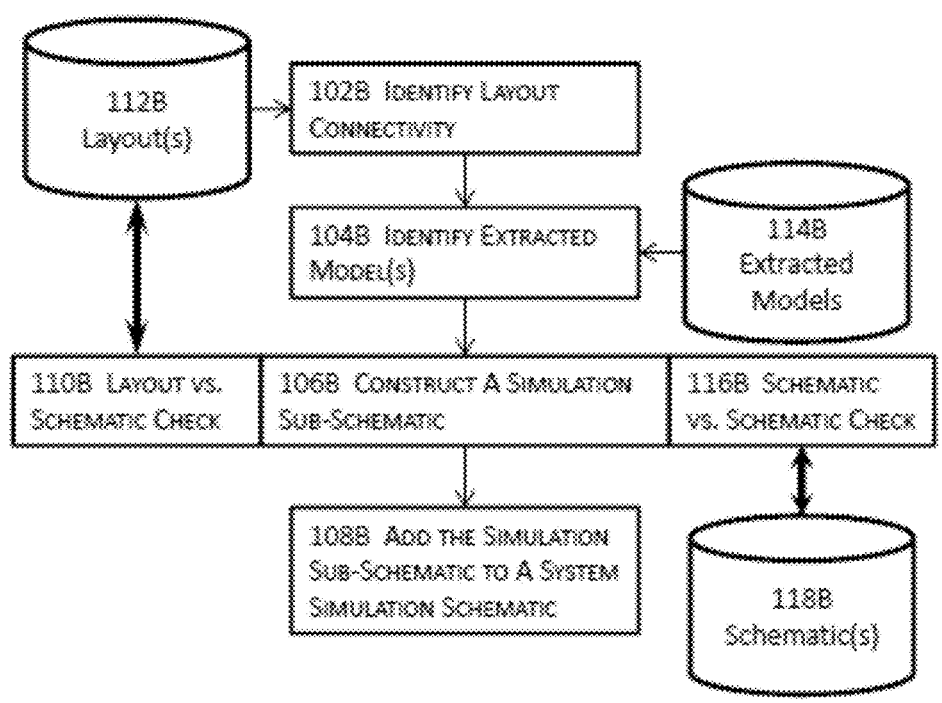
FIG. 1B illustrates another high level schematic block diagrams for constructing a simulation schematic of an electronic design across multiple design fabrics in one or more embodiments.

FIG. 1B illustrates another high level schematic block diagrams for constructing a simulation schematic of an electronic design across multiple design fabrics in one or more embodiments. In these embodiments, one or more layouts 112B may be identified from one or more non-transitory computer readable storage media or devices. These one or more layouts may include one or more integrated circuit (IC) layouts, one or more IC package layouts for the one or more IC layouts, and/or a printed circuit board (PCB) layout, etc.

Layout connectivity may be identified or extracted at 102B from these one or more layouts 112B, and the extracted layout connectivity may be used to interconnect various models in the simulation schematic. One or more extracted models may be identified at 104B from a list of extracted models 114B obtained from the same electronic design or one or more prior electronic designs.

It shall be noted that various schematics may or may not necessarily exist in these one or more embodiments illustrated in FIG. 1B. Existing schematic symbols or models may be leveraged such that extracted models need not be constructed every time they are needed in a simulation schematic. A schematic cellview symbol or model may be used directly as an extracted model in a simulation schematic in some embodiments or may be annotated, stitched, or associated with parasitic data to form an extracted model in some other embodiments.

In some embodiments where one or more schematic designs (e.g., the schematic of a PCB design, the schematic of an IC package, the schematic of an IC design, etc.) do exist, the schematic models or cellview symbols for circuit component designs in a plurality of design fabrics may thus be extracted from the respective schematic designs and imported as the extracted models into the simulation schematic. In some embodiments, a schematic cellview symbol or model may further be annotated or stitched with parasitic data and stored as an extracted model in a central repository.

These one or more schematic designs may or may not necessarily be in a format that is compatible or recognizable by the native editor of a simulation schematic. Schematic cellview symbols or models from these one or more schematic designs may be imported as extracted models into a simulation schematic via transformation in some embodiments or may be constructed anew and stored in a central repository in some other embodiments.

In some other embodiments where the schematic designs are unavailable or incomplete such that some circuit component designs extracted from one or more layouts (e.g., an IC layout, an IC package layout, a PCB layout, etc.) do not correspond to any existing schematic models or cellview symbols that may be used in simulation schematics, the extracted models for these layout circuit component designs may be constructed anew.

An extracted model includes a simplified model to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. For example, extracted models may be interconnected by straight or rectilinear flight-lines in some embodiments.

An extracted model may be constructed anew for a layout circuit component (e.g., an instance of a cell or block) and include a flat or a hierarchical structure of multiple hierarchies or a plurality of circuit components. For example, it may be determined that a circuit component design extracted from a layout does not correspond to any existing extracted models.

In some embodiments, an extracted model may be constructed by using a corresponding schematic cellview symbol or model from the schematic design (if available) or from a schematic cellview symbol data structure. For example, various techniques may first examine a schematic symbol cellview data structure (e.g., a list, a table, a database, etc.) to determine whether a schematic cellview symbol exists for the circuit component design. If an existing schematic cellview symbol exists for the circuit component design based on, for example, the type, identification, function, and/or connectivity, etc. of the circuit component design, the schematic cellview symbol may be retrieved from the schematic cellview symbol data structure to represent the layout circuit component.

The schematic cellview symbol may be further associated with other data (e.g., the identifications of ports for interconnection, the identifications of the layer, the instance, the hierarchy, etc.) specific to this particular circuit component to represent this particular circuit component in simulation schematics. In some other embodiments where no schematic cellview symbols or models correspond to the circuit component design extracted from the layout, a new schematic cell view symbol may be constructed anew with a native schematic editor that is capable of natively editing the simulation schematics in one or more design fabrics.

In some of these embodiments, an extracted model may include a geometric entity (e.g., a rectangle) that has any shape or size and is placeable in a simulation schematic or in the schematic design corresponding to the layout from which the circuit design component is extracted. In some other embodiments, an extracted model may include a geometric entity (e.g., a rectangle) that exactly, approximately, or proportionally represents the actual geometries of the circuit component (or circuit components).

These existing and newly constructed extracted models may thus be used to construct a simulation schematic at 106B for the electronic design that spans across multiple design fabrics. One or more layout versus schematic checks may be performed at 110B on the layouts 112B and the simulation schematic determined at 108B to determine whether the simulation schematic determined at 108B correctly corresponds to the layouts of the electronic design in these multiple design fabrics. In some embodiments where at least some schematic designs 118B are available, one or more schematic versus schematic checks may also be performed at 118B on these at least some schematics and the simulation schematic to determine whether the constructed simulation schematic correctly corresponds to these at least some schematics 118B.

The simulation schematic may be incrementally constructed and added as a simulation sub-schematic to a system simulation schematic at 108B. For example, an IC layout may be identified; circuit design components may be extracted from the identified IC layout; extracted models may be identified or constructed anew for these IC layout circuit design components; the simulation sub-schematic for the IC layout may be constructed with these extracted models; and the simulation sub-schematic may be incrementally constructed into a system simulation schematic (e.g., a system simulation schematic for a PCB design including the IC design).

Figure 1C:
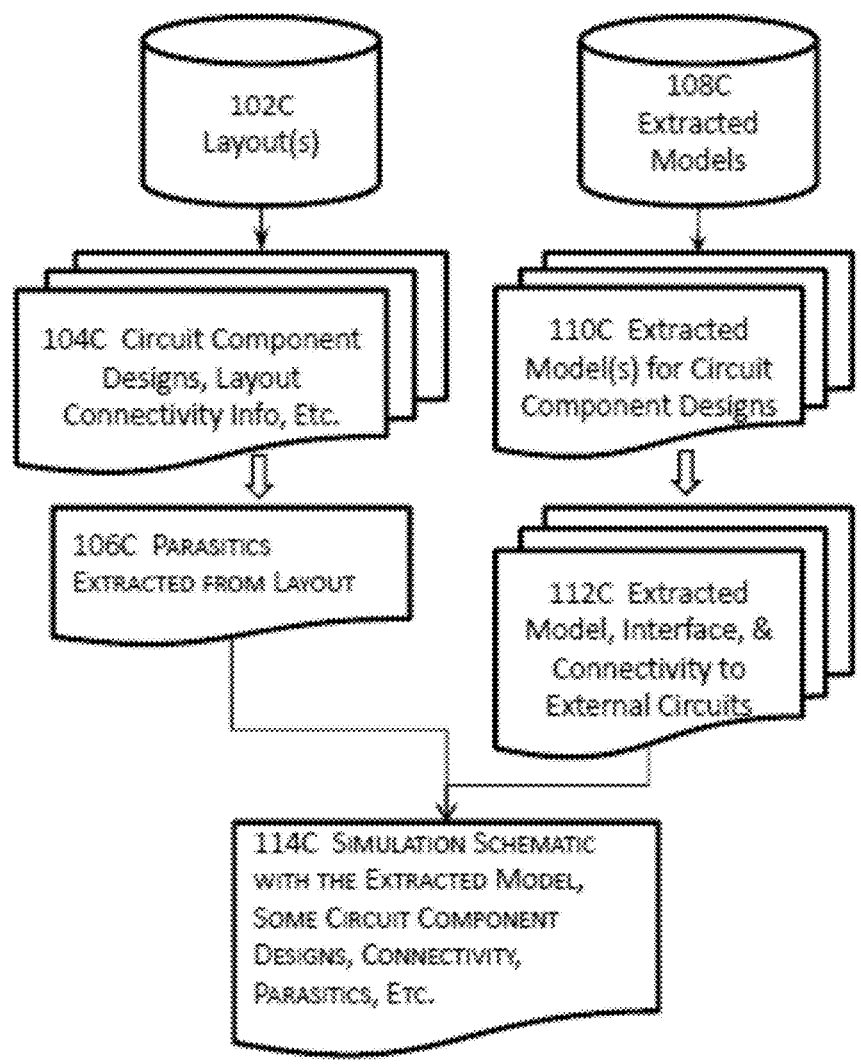
FIG. 1C illustrates another high level schematic block diagrams for constructing a simulation schematic of an electronic design across multiple design fabrics in one or more embodiments.

FIG. 1C illustrates another high level schematic block diagrams for constructing a simulation schematic of an electronic design across multiple design fabrics in one or more embodiments. In these embodiments, one or more layouts (e.g., one or more IC layouts, one or more IC package layouts corresponding to the one or more IC layouts, a PCB layout, etc.) may be identified from a non-transitory computer accessible store medium or device 102C; and existing extracted models corresponding to respective layout circuit components may be retrieved from an extracted model data structure 108C in the same or a different non-transitory computer accessible store medium or device. Circuit component designs and layout connectivity information for interconnecting among these circuit component designs and external circuitry 104C may be extracted from the one or more layouts 102C. Parasitic data 106C may also be extracted from these one or more layouts 102C.

If extracted models 108C exist for at least some circuit component designs in the one or more layout 102C, these extracted models 110C may be retrieved from the extracted model data structure 108C. These existing extracted models, their respective interface information (e.g., the names of the ports, the names of nets connected to the interface, etc.), and/or connectivity information to external circuitry of an extracted model 112C may be identified. In some embodiments, these extracted models themselves may already include or be associated with parasitics and connectivity information.

These existing extracted models for some layout circuit component designs together with newly constructed extracted models for other layout circuit component designs for which no extracted models exist may be placed into a simulation schematic 114C. For example, a layout may include circuit component designs L1, C1, R2, Q4, U1, U2, and L7, where existing extracted models are determined to be available for layout circuit component designs C1, R2, and L7. In this example, the simulation schematic for this layout may include the existing extracted models for C1, R2, and L7 as well as newly constructed extracted models for L1, Q4, U1, and U2.

Figure 1D:
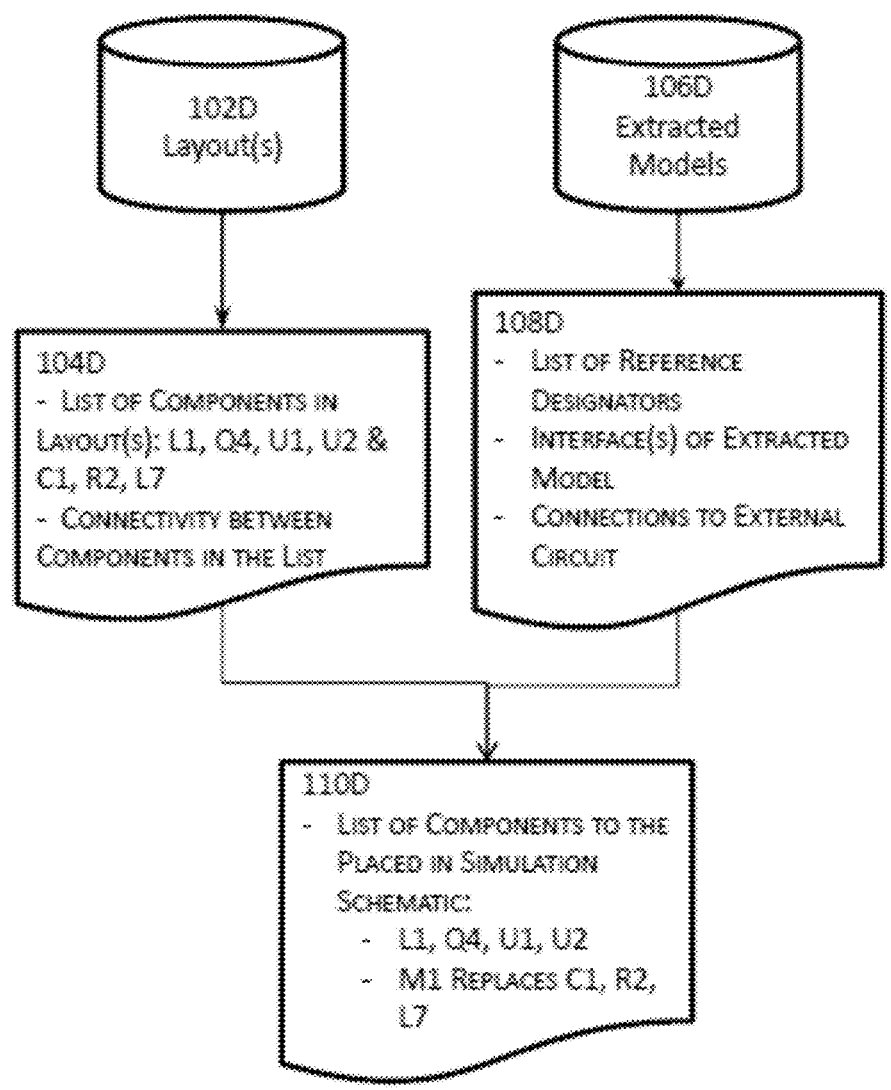
FIG. 1D illustrates an example of determining a list of circuit component designs to place in a simulation schematic in one or more embodiments.

This example is further illustrated in FIG. 1D which illustrates an example of determining a list of circuit component designs to place in a simulation schematic in one or more embodiments. From the layout 102D, a list of circuit component designs 104D in the layout (e.g., L1, Q4, U1, U2, C1, R2, and L7) may be obtained from the layout 102D. In addition, the connectivity between these circuit component designs in the list may also be determined and added to 104D. As described above, an extracted model M1 already exists for the circuit component designs C1, R2, and L7 and may be retrieved from a data structure or database 106D including extracted models. A list of reference designators and the interfaces for the extracted models (e.g., M1) may also be retrieved from the data structure or database 106D. The connectivity information of an extracted model (e.g., M1) may also be retrieved from the data structure or database 106D of extracted models. With the list of components and the connectivity from 104D and the list of reference designators and the interface and connectivity for the extracted model (M1), a list of components or models to be placed in the corresponding simulation schematic 110D may be determined. In this example, the simulation schematic 110D may include the circuit component designs or the schematic symbols or models thereof for L1, Q4, U1, and U2 that do not correspond to any extracted models. The simulation schematic may further include the extracted model M1 that is to replace the circuit component designs (or the schematic symbols or models thereof) for circuit component designs C1, R2, and L7. In some embodiments, an extract model (e.g., M1 in this example illustrated in FIG. 1D) may include, for example, an s-parameter (scattering-parameter) model.

In some embodiments where individual extracted models may not be available or exist, but an aggregated extracted model may nevertheless exist for a plurality of interconnected circuit component designs. In these embodiments, the aggregated extracted model may be identified and used to represent the plurality of interconnected circuit component designs in simulation schematics. In the aforementioned example where no extracted models exist for layout circuit components L1, Q4, U1, and U2, but an aggregated extracted model nevertheless exists and includes these layout circuit components L1, Q4, U1, and U2.

In this example, the aggregated extracted model together with the data of its interface to external circuits, rather than individual extracted models for L1, Q4, U1, and U2, may be used in a simulation schematic in some embodiments. In some embodiments, all the circuit component designs may be first added to a placement list. For a circuit component that corresponds to an existing extracted model, the existing extracted model may be placed in the simulation schematic. For another circuit component design for which no existing extracted models exist, a new extracted model may be constructed and placed into the simulation schematic.

Figure 2A:
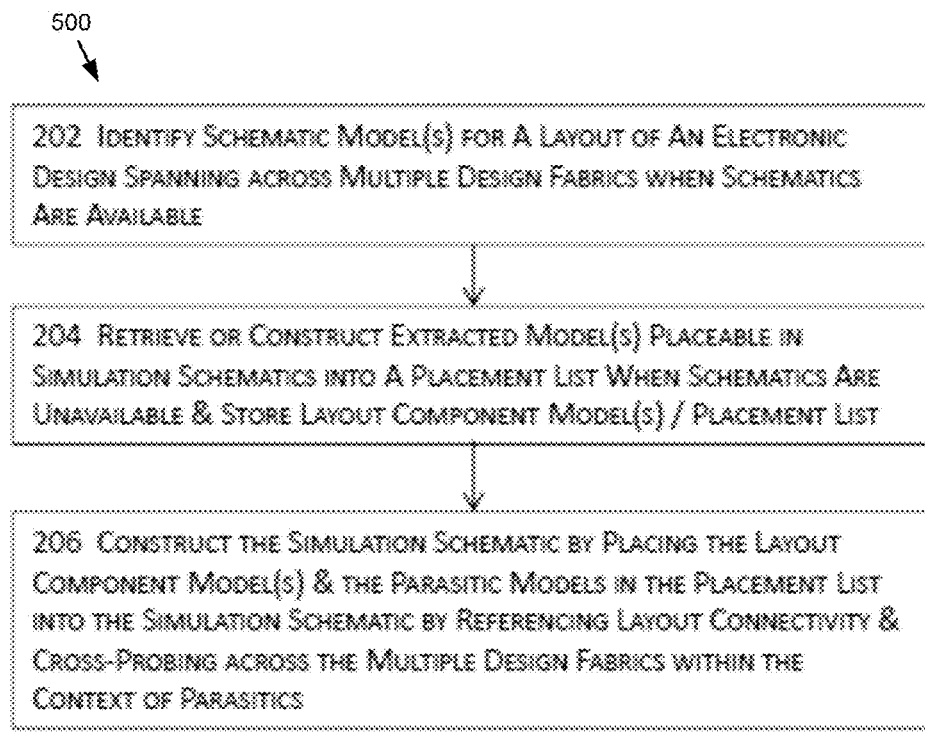
FIG. 2A illustrates a high-level block diagram for constructing a simulation schematic of an electronic design across multiple design fabrics in one or more embodiments.

FIG. 2A illustrates a high-level block diagram for constructing a simulation schematic of an electronic design across multiple design fabrics in one or more embodiments. In these one or more embodiments, one or more schematic models may be identified at 202 for a layout of an electronic design that spans across multiple design fabrics when these one or more schematic models are available.

It shall be noted that various techniques described herein do not require schematic designs to perform their intended functions to achieve their intended purposes although elements (e.g., schematic model or cellview symbols, connectivity, etc.) of schematic designs, regardless of whether these schematic designs are complete or partial, may nevertheless be used to reduce the computational resources and/or time needed to constructed a simulation schematic for an electronic design across multiple design fabrics in some embodiments.

A schematic model may include a schematic symbol and connectivity information for interconnecting the schematic symbol to external circuitry. The identified schematic models may be stored in a data structure such as a list, a table, a database, etc. For the ease of explanation or description, the data structure includes and will be referred to as a placement list although other types of data structures may also be used.

Schematic models, like schematic designs, may have the same format or different formats. For example, a PCB schematic design or a PCB schematic model therein may have a different format than an IC schematic design or an IC schematic model therein. In some embodiments, schematic models in different formats may be transformed into a format that is recognized by a native schematic editing tool in one of the multiple design fabrics. For example, PCB schematic models in a first format and IC package schematic models in a second format may be transformed into another format recognizable by an IC schematic editor. In some other embodiments, a new schematic model may be constructed for a schematic model in a different format.

At 204, extracted models may be retrieved from existing sources or constructed anew for layout circuit designs in the layout. An extracted model includes a simplified model having a geometric entity to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. These extracted models may also be stored in a data structure such as the aforementioned placement list.

At 206, a simulation schematic may be constructed by placing the extracted models into the simulation schematic and further by interconnecting the extracted models with connectivity information extracted from the layout. In some embodiments where schematic cellview symbols or models are also identified for one or more layout circuit components that correspond to no extracted models or aggregated models, the schematic cellview symbols or models may also be placed in the simulation schematic. In addition or in the alternative, parasitic data extracted from the layout may also be stitched into or associated with the corresponding schematic cellview symbols or models or may be placed into the simulation schematic if these schematic cellview symbols or models are also placeable.

Figure 2B:
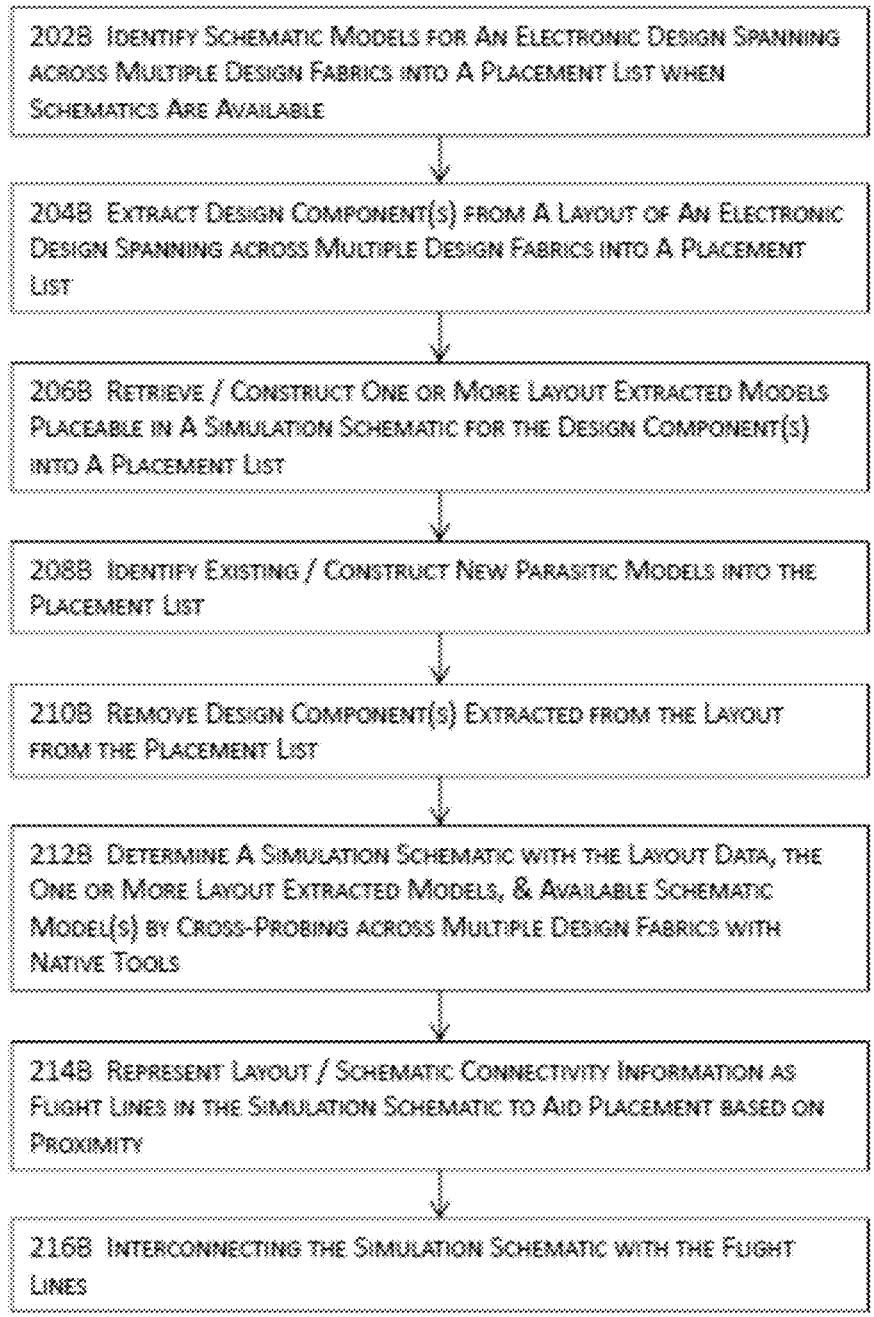
FIG. 2B illustrates a more detailed block diagram for constructing a simulation schematic of an electronic design across multiple design fabrics in one or more embodiments.

FIG. 2B illustrates a more detailed block diagram for constructing a simulation schematic of an electronic design across multiple design fabrics in one or more embodiments. In these embodiments illustrated in FIG. 2B, available schematic models corresponding to layout circuit components may be identified at 202B for an electronic design that spans across multiple design fabrics. In some embodiments, the electronic design includes at least one PCB design having one or more IC package designs interconnected together and encompassing the one or more corresponding IC designs.

A schematic model may include an object that includes a schematic symbol, some connectivity information for interconnecting the schematic model to external circuitry, and parasitic information in some embodiments. In some other embodiments, a schematic model may include a schematic cellview symbol or model that is retrieved from a schematic cellview data structure storing therein a plurality of schematic cellview symbols each having one or more parameters awaiting their corresponding one or more values to determine the characteristics or attributes of a specific circuit component that is represented by the schematic cellview symbol or model in a schematic design.

In these embodiments, the schematic cellview symbol or model for a particular layout circuit component may be elaborated by identifying the one or more corresponding parameter values such as names or identifications of the schematic circuit component design represented by the symbol, nets, ports, pins, layer(s), instance(s), etc., interface or interfaces, connectivity information for interconnecting the interface or interfaces to external circuits, or any other information suitable for creating a schematic cellview symbol or model to uniquely represent one or more such schematic circuit component designs in a schematic design.

The schematic editing mechanism that natively manipulates extracted models may invoke various drawing capabilities of the schematic editing mechanism or one or more other mechanisms in one design fabric (e.g., a layout editing mechanism in an IC design fabric) and function in tandem with editing mechanisms that natively manipulate data in one or more other design fabrics to cross probe circuit component designs in one or more schematics and/or layouts across multiple design fabrics to automatically identify the one or more parameter values to create a unique schematic model and associate information such as the parasitic information and/or some connectivity information to generate an extracted model from the unique schematic model for a layout circuit component design that corresponds to no existing extracted models.

As described above, schematics may or may not necessarily be available or complete for some or all of the designs in the multiple design fabric electronic design. The identification of schematic cellview symbols or models when some schematics are available may reduce the computational resources and runtime in generating a simulation schematic.

At 204B, layout circuit component designs may be extracted from one or more layouts of the electronic design spanning across multiple design fabrics. In some embodiments, these layout circuit components or information therefor (e.g., identifications of layout circuit component designs with pointers, link structures, or symbolic links to these layout circuit component designs) may be stored in a data structure such as a list, a table, a database, etc. such as a placement list.

One or more layout extracted models corresponding to the one or more identified layout circuit component designs may be retrieved or extracted from a non-transitory computer accessible storage medium or device at 206B. In some embodiments where no extracted models are available for certain layout circuit component designs, additional extracted models may be constructed anew for these certain layout circuit component designs at 206B. An extracted model includes a simplified model to represent one or more layout circuit component designs in a simulation schematic in some embodiments.

In some of these embodiments, an extracted model is placeable in a simulation schematic and includes model connectivity information (e.g., net names, port names, pin names, etc.) that may be used to interconnect the extracted model to one or more other models or external circuitry in the simulation schematic. In addition or in the alternative, an extracted model may further include parasitic information that is stitched into or associated with the elements (e.g., circuit components, traces, wires, interconnects, etc.), parasitic models encompassing the parasitic information, or a combination thereof.

At 208B, existing parasitic models indicative of parasitic information or data of one or more layout circuit components may be identified. A parasitic model may include an s-parameter or SPICE model that represents the R/L/C parasitics of the traces, interconnects, and/or metal structures in an electronic design. In some embodiments where parasitic models are unavailable for certain layout circuit component designs, new parasitic models may be constructed by extracting the corresponding parasitic information or data for these layout circuit component designs from the layout.

The existing and newly constructed parasitic models at 208B and/or the extracted models at 206B or information therefor may be added to the data structure identified at 202B. In some embodiments where extracted models or schematic cellview models together with the corresponding parasitic information or parasitic models are identified or constructed for any layout circuit component designs in the data structure, these layout circuit component designs or information therefor in the data structure may be removed from the data structure at 210B because of the placeability and the completeness of information of these extracted models and the schematic cellview symbols or models plus the corresponding parasitic information.

At 212B, a simulation schematic may be determined with data or information associated with the one or more layouts, the one or more extracted models, one or more available schematic cellview symbols or models by cross probing within the same design fabric and/or across multiple design fabrics. The data or information associated with the one or more layouts may include, for example, connectivity extracted from the one or more layouts. Cross probing across multiple design fabrics comprises the determination of which net segments in which specific design fabric are part of or connecting to a specific net in another design fabric in some embodiments.

In some of these embodiments, probing may determine a list of net segment for the entire net from its source to its destination across multiple design fabrics. In addition or in the alternative, probing may also determine data or information associated with a particular net or various nodes along the particular net. For example, probing may identify or determine various electrical data (e.g., nodal voltages, currents, current densities, electromigration data, etc.) or physical or electrical parasitics (e.g., dimensional data, temperatures, resistances, capacitances, inductances, etc.) at various nodes or portions of a net.

Probing results may be textually and/or graphically emphasized in a user interface. As another example, a net connecting a first pin at the top level of a test bench through a first net to a first IC package in a PCB, a second net from the first IC package to a die, and a third net within the die may be identified with the same textual or graphical emphasis or annotations (e.g., with the same line type, line size, color, or other annotations) through probing.

Connectivity data or information extracted from the one or more layout may be represented as flight-lines to interconnect the extracted models, the parasitic models, and/or the available schematic cellview symbols or models, etc. in the simulation schematic at 214B to aid placement or insertion of these models into the simulation schematic. In some embodiments, placing or inserting a model in a simulation schematic may be based in part or in whole upon proximity between two or more models or proximity between one or more models and one or more flight-lines or one or more segments thereof as indicated by the connectivity information or data.

A flight-line may include a straight line segment between its source and destination in some embodiments or a set of rectilinear line segments between the source and the destination of the flight-line in some other embodiments. It shall be noted that unlike placement of layout shapes in a layout, placement or insertion of models in a simulation schematic does not necessarily produce geometrically or topologically accurate results because the simulation schematic symbolically or generally but does not geometrically represent how models are connected with flight-lines. In some embodiments where a flight-line includes a set of connected rectilinear line segments, these connected rectilinear line segments may or may not topologically or geometrically represent how the wires or traces will be implemented. The interconnection of various elements in the simulation schematic may be completed by using the flight-lines at 216B.

Figure 2C:
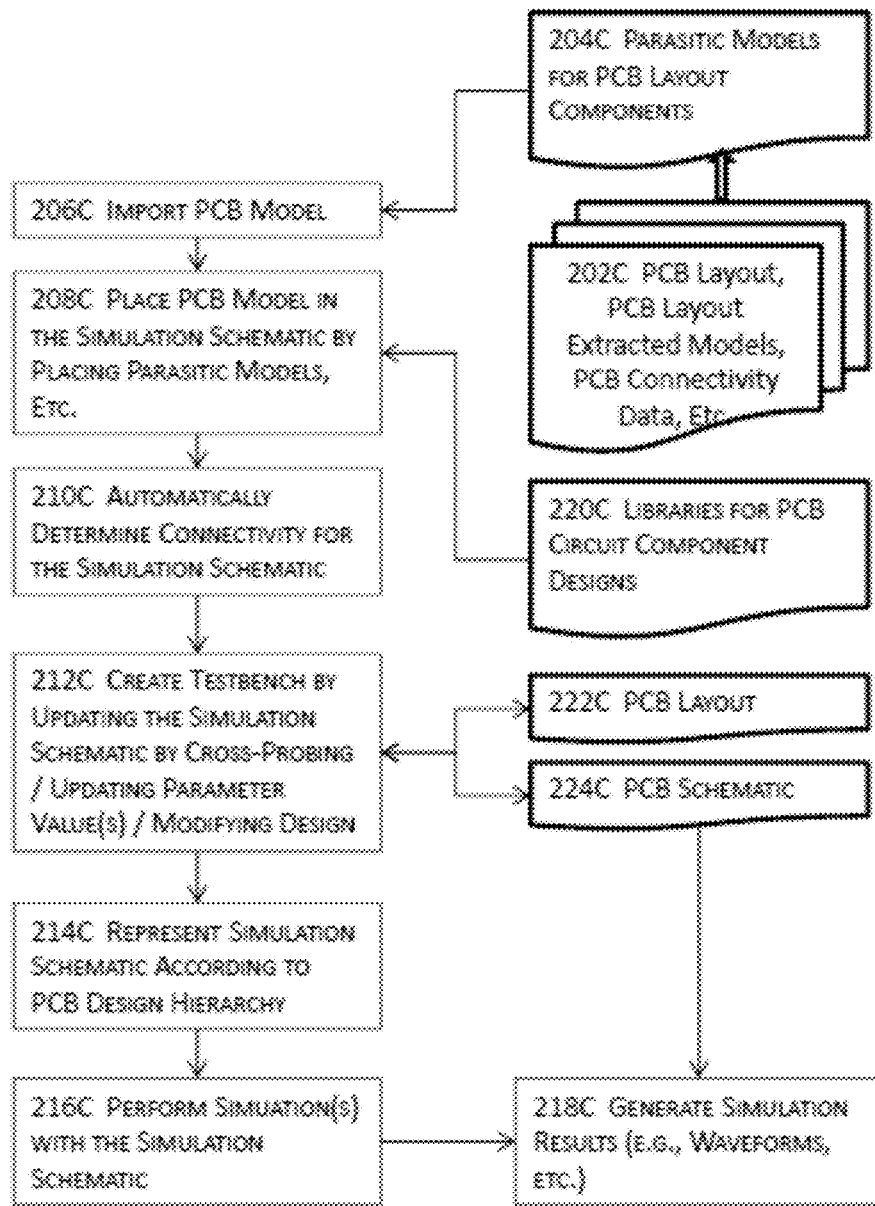
FIG. 2C illustrates another more detailed block diagram for constructing a simulation schematic of an electronic design across multiple design fabrics in one or more embodiments.

FIG. 2C illustrates another more detailed block diagram for constructing a simulation schematic of an electronic design across multiple design fabrics in one or more embodiments. In these embodiments, a PCB layout and one or more pieces of information 202C may be identified. These one or more pieces of information may include, for example, one or more extracted models for components in the PCB layout, connectivity data extracted from the PCB layout, or any other required or desired data or information for constructing a simulation schematic including a schematic representation of the PCB layout in some embodiments.

An extracted model may include parasitic data or information in some embodiments or no parasitic data or information in some other embodiments. An extracted model may include names, numbers, and/or identifications of pins, ports, pads, nets, or net segments, etc. Parasitic models 204C may also be determined or identified for extracted models (when extracted models do not include parasitic information) and one or more PCB layout component designs that do not correspond to any extracted models regardless of whether or not extracted models include parasitic information.

The PCB model may be imported at 206C into a simulation schematic at 208C by placing the parasitic models, the extracted models, etc. with the connectivity data extracted from the PCB layout. One or more libraries for PCB circuit component designs 202C may also be provided to aid placing or inserting the PCB model in the simulation schematic in some embodiments. In some embodiments where the PCB model, the PCB extracted models, or the PCB parasitic models are in one or more formats that are not native to an editing mechanism of the simulation schematic, the importation of the PCB model into the simulation schematic may include transformation, mapping, translation, or reconstruction, etc. of these models in one or more models in one or more non-native formats into one or more formats that are native to the simulation schematic editing mechanism.

Connectivity may be automatically determined at 210C for the simulation schematic and various sub-models (e.g., IC package models, models for discrete components, etc.) from the PCB layout by cross probing. For example, cross probing may use respective native tools to establish the connectivity for a net interconnecting a discrete component and an IC package model and associate the flight-line in the simulation schematic, the model for the discrete component or an interface thereof, and the model for the IC package design or an interface thereof with the corresponding connectivity information.

Connectivity may include, for example, how various circuit component designs in the PCB layout are connected, the terminal order and/or identifications of an interface of a circuit component design, and/or a mapping to a split symbol instances or nets, etc. in some embodiments. A testbench may be created at 212C by updating the simulation schematic via cross-probing, updating parameter values, and/or modifying the underlying electronic design in some embodiments.

A layout versus schematic check may be performed on the testbench created at 212C by referencing the PCB layout 222C in some embodiments to cross check the correctness of the testbench, the simulation schematic, and/or the PCB layout. In some embodiments where the PCB schematic is available, a schematic versus schematic check may also be performed on the simulation schematic or the testbench by referencing the PCB schematic 224C to cross check the correctness of the testbench, the simulation schematic, and/or the PCB schematic.

The testbench may be represented in a hierarchical structure at 214C according to the hierarchical structure of the PCB design in some embodiments or in a flat structure having only one hierarchical level in some other embodiments. Simulations may be performed at 216C with the simulation schematic to generate simulation results including, for example, waveforms of signals, etc. at 218C. In some embodiments where the PCB schematic is available, the PCB schematic 224C may also be associated with the simulation results generated at 218C.

Figure 3A:
FIG. 3A illustrates a block diagram for cross probing a simulation schematic across multiple design fabrics in one or more embodiments.

FIG. 3A illustrates a block diagram for cross probing a simulation schematic across multiple design fabrics in one or more embodiments. In these embodiments, design components in the simulation schematic (e.g., the simulation schematic constructed at 206) may be cross-probed at 302 by using one or more native schematic editors, one or more layout editors, or any combinations thereof, without using any translators, compilers, or specifically designed editors or parsers. Design data are native to a tool or mechanism if the tool or mechanism may be used to generate, access, modify, and/or maintain the design data without performing any transformation, mapping, export, or abstraction on the design data in some embodiments.

In some of these embodiments, only design data that are native to a tool or mechanism are visible to and accessible by the tool or mechanism. On the other hand, design data are non-native to a tool or mechanism if the tool or mechanism cannot access the design data without performing some transformation, exportation, or mapping on the design data. In some of these embodiments, design data that are non-native to a tool or mechanism are invisible to and hence inaccessible by the tool or mechanism. At 304, a request for identifying a design component in the simulation schematic may be received at an EDA (electronic design automation) tool. For example, a pin in an electronic design (e.g., a schematic or a layout) may be identified by clicking on the pin in a design window showing a portion of an electronic design at 304.

At 306, one or more corresponding design components that correspond to or are associated with the identified design component may be automatically identified in one or more schematics (e.g., an IC schematic, an IC package schematic, a PCB schematic, etc.) in the corresponding native schematic editor(s) and/or one or more layouts (e.g., an IC layout, an IC package layout, a PCB layout, etc.) in the corresponding native layout editor(s). At 308, the one or more identified corresponding design components may be presented in the native schematic editor(s), the native layout editor(s), or any combinations thereof. The one or more identified corresponding design components may be automatically emphasized by using textual emphasis, graphical emphasis, or a combination thereof at 310.

In addition or in the alternative, a request for identifying a parasitic model in the simulation schematic may be received at 312. For example, a designer may identify a particular parasitic model in the simulation schematic by clicking on the particular parasitic model in a design window showing a portion of an electronic design at 312. At 314, one or more corresponding design components or one or more nets corresponding to or associated with the identified parasitic model may be automatically identified in the design schematic(s) (e.g., an IC schematic, an IC package schematic, a PCB schematic, etc.) and/or one or more layouts (e.g., an IC layout, an IC package layout, a PCB layout, etc.).

At 316, the one or more identified corresponding design components or one or more nets may be presented in the user interface(s) of their respective native schematic editor(s) or respective layout editor(s) in response to the request for identifying a parasitic model received at 312. At 318, the simulation schematic may be optionally verified against the design schematic(s) and/or the design layout(s) in some embodiments.

Figure 3B:
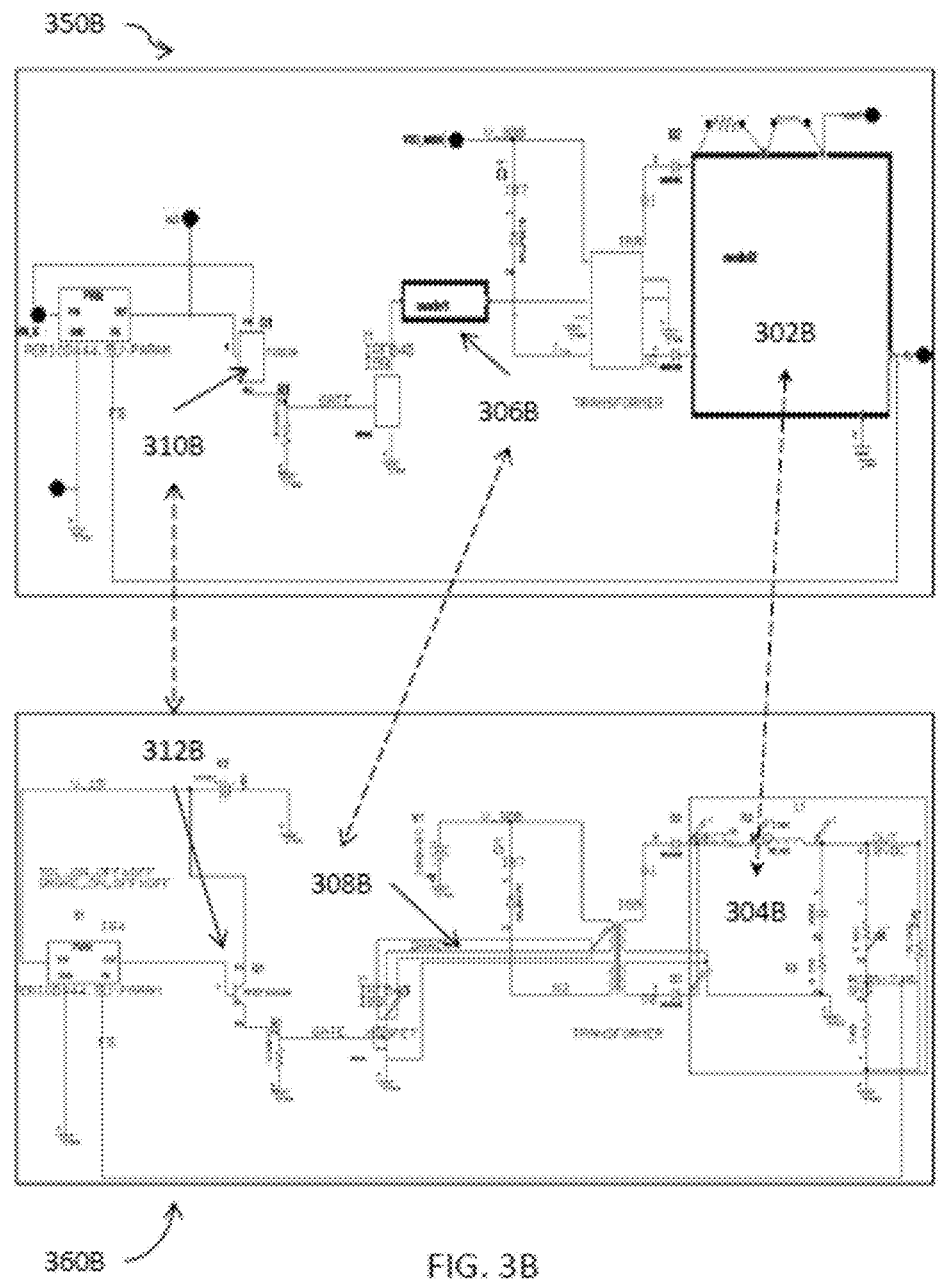
FIG. 3B illustrates some examples of cross probing a simulation schematic with respect to a master schematic in one design fabric of multiple design fabrics in one or more embodiments.

FIG. 3B illustrates some examples of cross probing a simulation schematic with respect to a master schematic in one design fabric of multiple design fabrics in one or more embodiments. In these one or more embodiments, cross probing circuit components (e.g., 302B, 306B, and 310B) in a simulation schematic 350B automatically may invoke the master schematic 360B to highlight the corresponding circuit components (e.g., 304B, 308B, and 312B) in the master schematic 360B. Similarly, cross probing the corresponding circuit components (e.g., 304B, 308B, and 312B) in the master schematic 360B automatically may invoke simulation schematic to highlight the circuit components (e.g., 302B, 306B, and 310B) in a simulation schematic 350B.

Figure 4A:
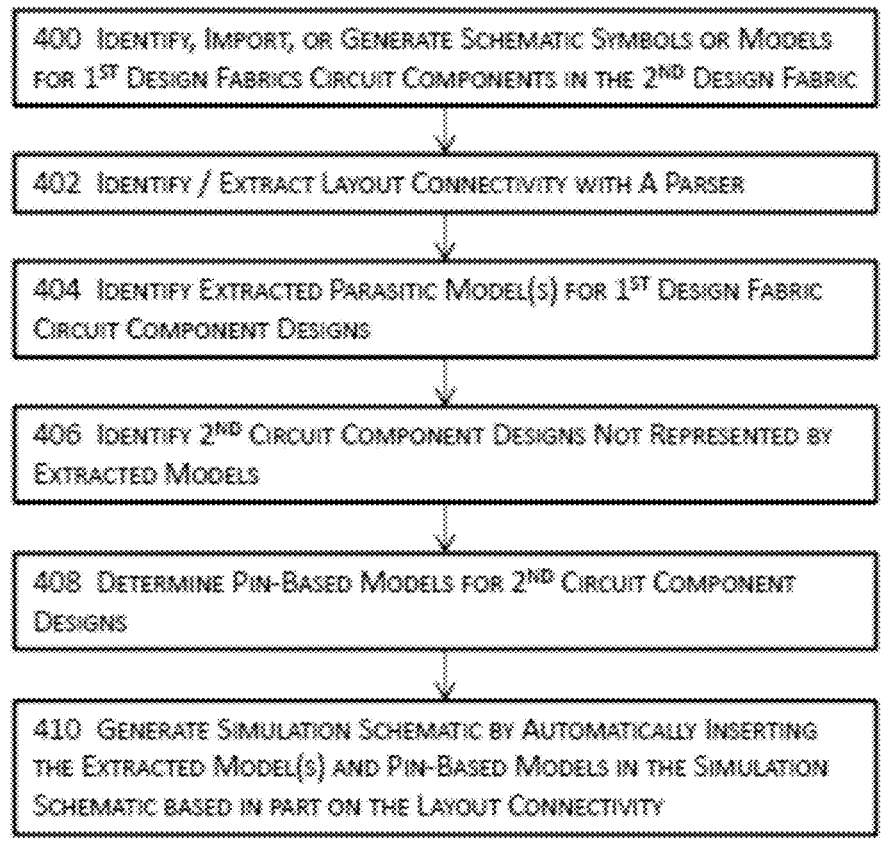
FIG. 4A illustrates a more detailed block diagram for constructing a simulation schematic of an electronic design across multiple design fabrics in one or more embodiments.

FIG. 4A illustrates a more detailed block diagram for constructing a simulation schematic of an electronic design across multiple design fabrics in one or more embodiments. In these one or more embodiments, one or more schematic cellview symbols or models for one or more first design fabric circuit component designs may be identified, imported, or generated for the second design fabric at 400. For example, a schematic cellview model for an IC package design in the IC package design fabric may be identified, imported, or generated for the IC design fabric.

Figure 4B:
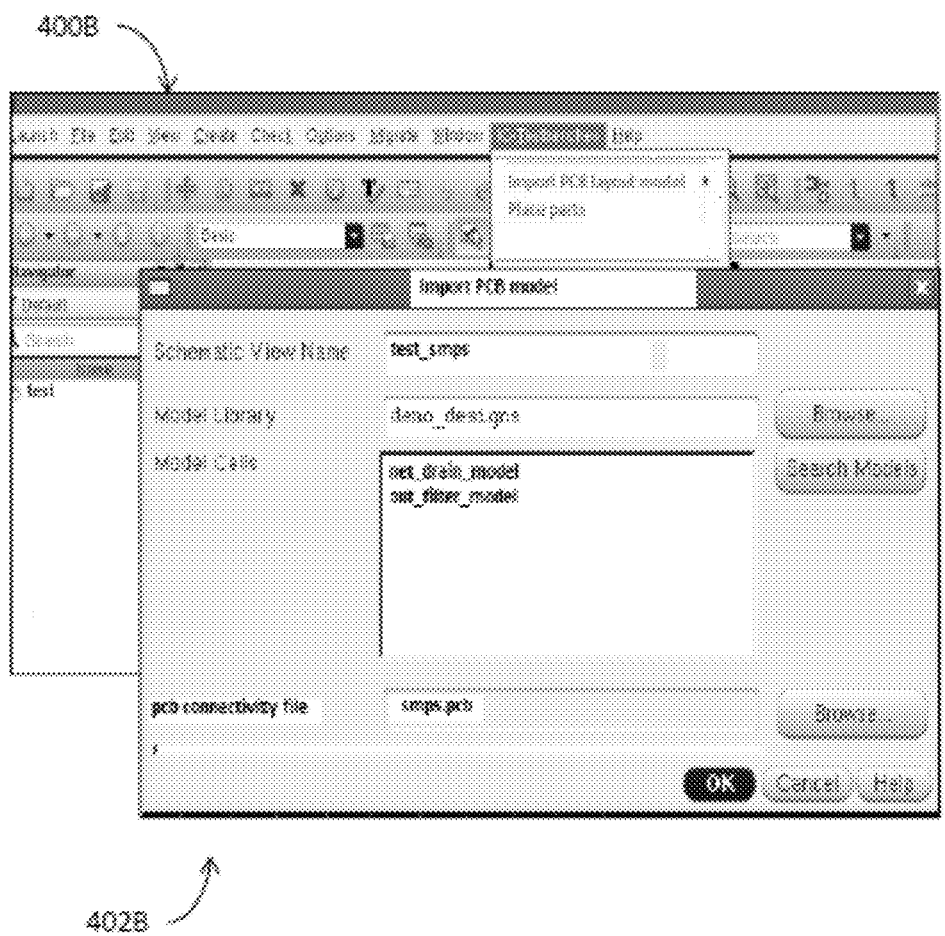
FIGS. 4B-G illustrate an example of constructing a simulation schematic of an electronic design across multiple design fabrics in one or more embodiments.

An example is illustrated in FIG. 4B, which illustrates an example of constructing a simulation schematic of an electronic design across multiple design fabrics in one or more embodiments. More specifically, FIG. 4B illustrates a user interface 400B for importing PCB libraries into an IC schematic editing mechanism to create the PCB schematic model and the IC package schematic models in the IC schematic editing mechanism in some embodiments. The user interface 400B further includes a toolbar which, when actuated, brings up a dialog box 402B for importing a PCB mode. The dialog box 402B includes, for example, the name of the schematic view 408B, the model library 404B, and the model cells 406B.

Layout connectivity may be identified or extracted at 402 from the layout for the one or more first design fabric circuit component designs. In some embodiments, a design parsing mechanism may be used to extract connectivity from a layout. Extracted models with or without parasitic information or embedded parasitic models may be identified at 404 for one or more circuit component designs in the first design fabric. One or more second circuit component designs in the first design fabric that do not correspond to extracted models may be identified at 406. For these second circuit design designs, one or more pin-based schematic models may be determined at 408.

In some embodiments, a pin-based schematic model includes a schematic symbol and identifications of pins or ports that are located at an interface and may be referenced in interconnecting the pin-based schematic model to one or more nets or net segments. At 410, a simulation schematic may be generated or updated by automatically inserting or placing the extracted models and the pin-based models into the simulation schematic based in part or in whole on connectivity information extracted at 402. In some embodiments, the extracted models and the pin-based models may be interconnected by flight-lines. In some of these embodiments, flight-lines may be constructed in a way to mimic the appearance of interconnects with 90-degree bends. In some other embodiments, flight-lines may be constructed with straight line segments connecting respective sources and destinations.

Figure 4C:
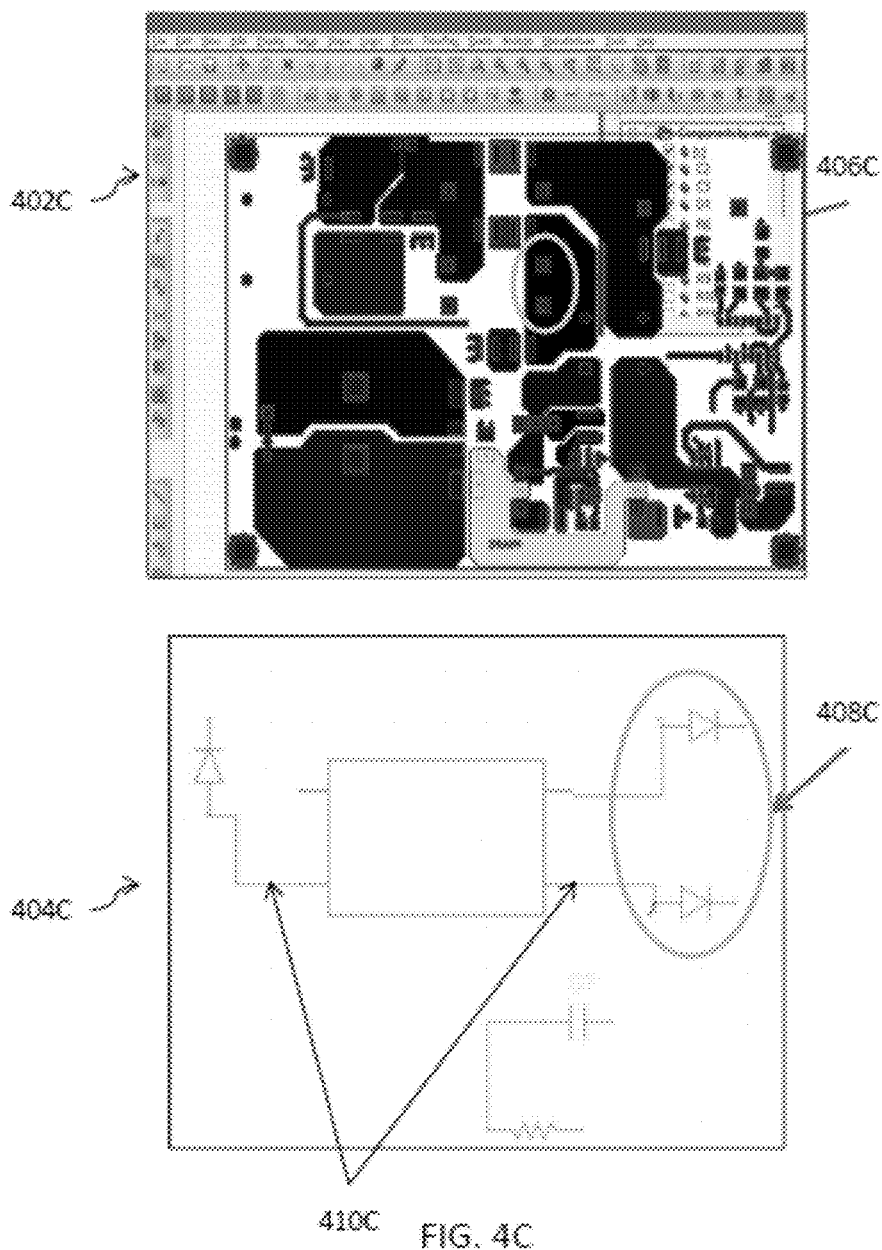

FIGS. 4C-G illustrates an example of constructing a simulation schematic of an electronic design across multiple design fabrics in one or more embodiments. FIG. 4C illustrates an example of constructing a parasitic aware simulation schematic from layouts across multiple design fabrics in some embodiments. More specifically, FIG. 4C illustrates a PCB layout 402C including two identified layout components 406C. FIG. 4C further includes a portion of a simulation schematic 404C constructed with some techniques described herein.

The simulation schematic 404C includes the schematic cellview symbol 406C for those two identified layout components 406C. The schematic cellview symbol 406C may be retrieved from, for example, a schematic cellview database and placed into the simulation schematic 404C. The simulation schematic 404C also comprises flight-lines 410C that may be automatically inserted based in part or in whole upon the connectivity extracted from the layout 402C. These flight-lines may be used to denote interconnection of various schematic models in the simulation schematic 404C.

Figure 4D:
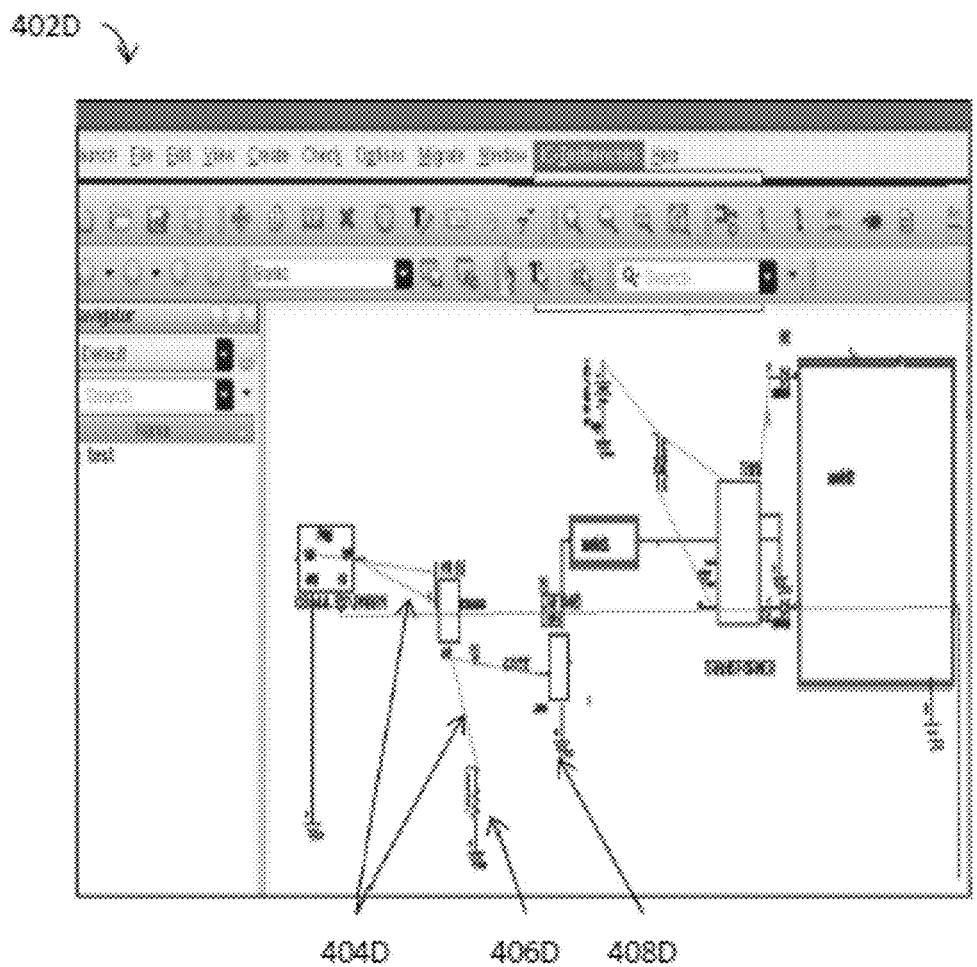

FIG. 4D illustrates a portion of a simulation schematic 402D that includes, among other circuit components, flight-lines 404D, a first parasitic model 406D (e.g., a resistor model), and a second parasitic model 408D (e.g., a capacitor model). In these embodiments illustrated in FIG. 4D, parasitic information may be annotated, stitched, or otherwise automatically inserted into a simulation schematic in the form of parasitic model as shown in FIG. 4D or may be embedded in extracted models (not shown in FIG. 4D) as described in some aforementioned examples.

Figure 4E:
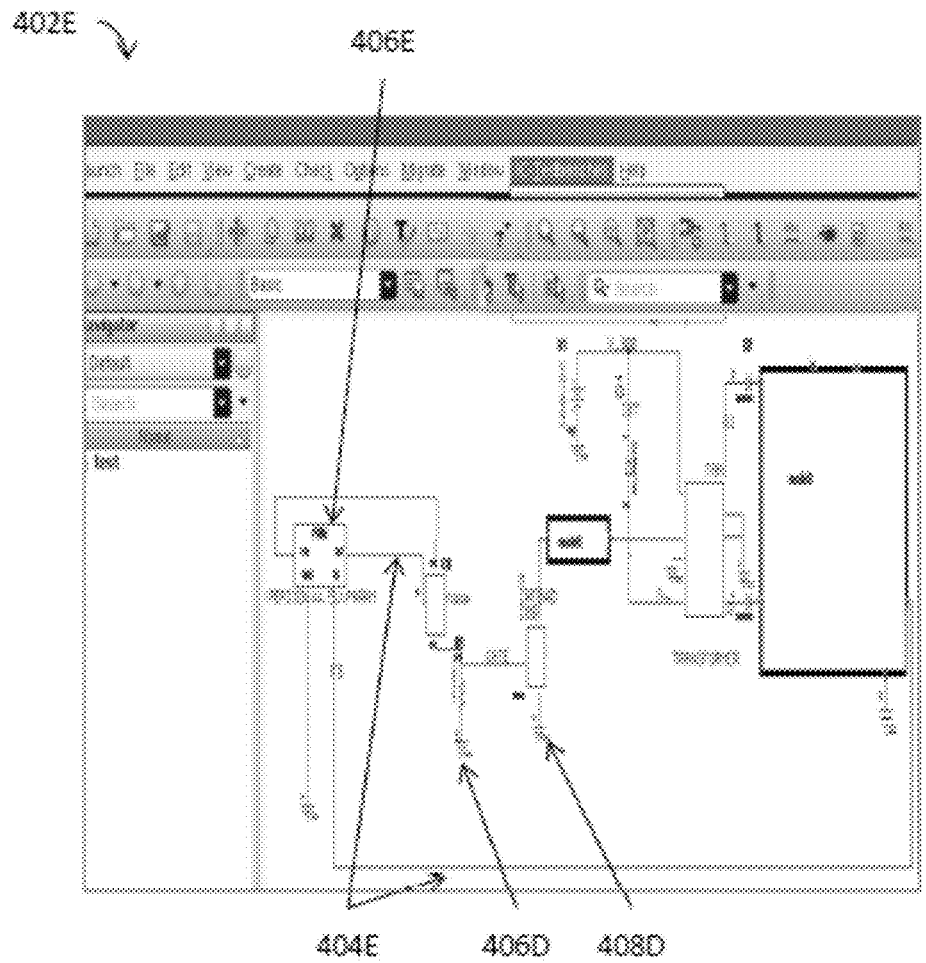

FIG. 4E illustrates a portion of a simulation schematic 402E that includes an IC package extracted model 406E, a first parasitic model 406D (e.g., a resistor model), and a second parasitic model 408D (e.g., a capacitor model). The portion of the simulation schematic 402E also includes a set of rectilinear flight-lines 404E, rather than straight flight-lines connecting respective sources and destinations as shown in FIG. 4D.

Figure 4F:
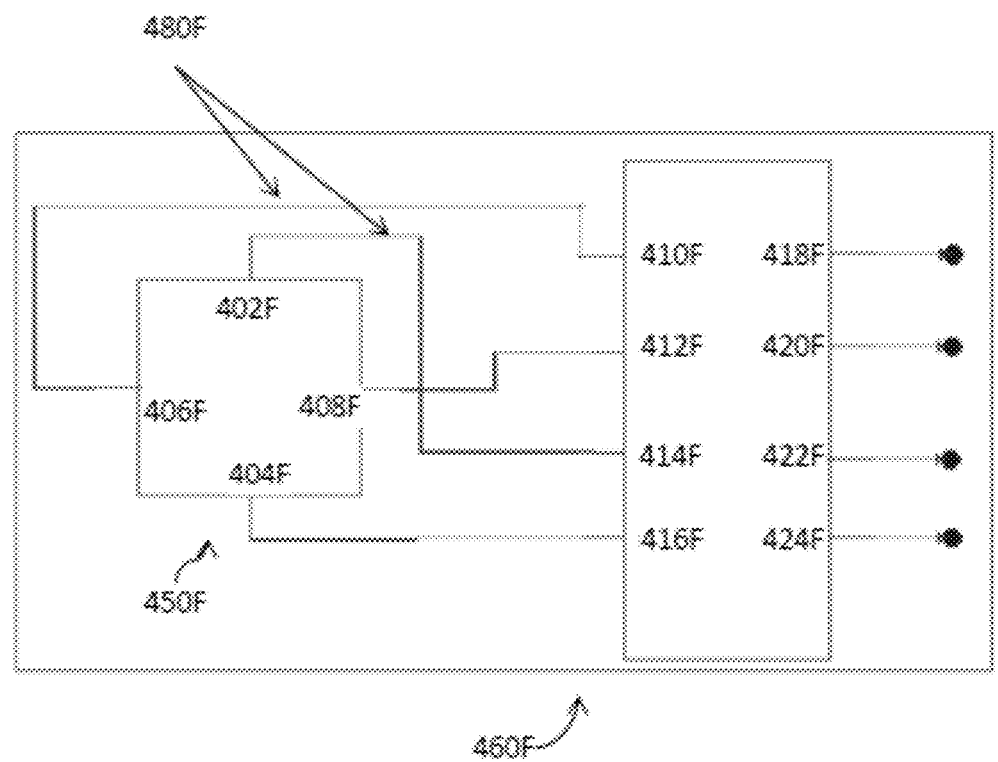

FIG. 4F illustrates an example of an extracted IC package model 460F with respect to the extracted IC model 450F. The extracted IC model 450F includes names or identifications of the pins or ports 402F, 404F, 406F, and 408F. These names or identifications of the extracted IC model 450F may be referenced in interconnecting the extracted IC model 450F to the corresponding ports or pins (e.g., 410F, 412F, 414F, and 416F) of the IC package model 460F. A set of rectilinear flight-lines 470F may be used to illustrate how the IC extracted model 450F is connected to the extracted IC package model 460F. The extracted IC package model 460F may further includes connectivity information (e.g., names or identifications of additional pins or ports 418F, 420F, 422F, and 424F) that may be referenced in connecting the extracted IC package model to external circuits.

Figure 4G:
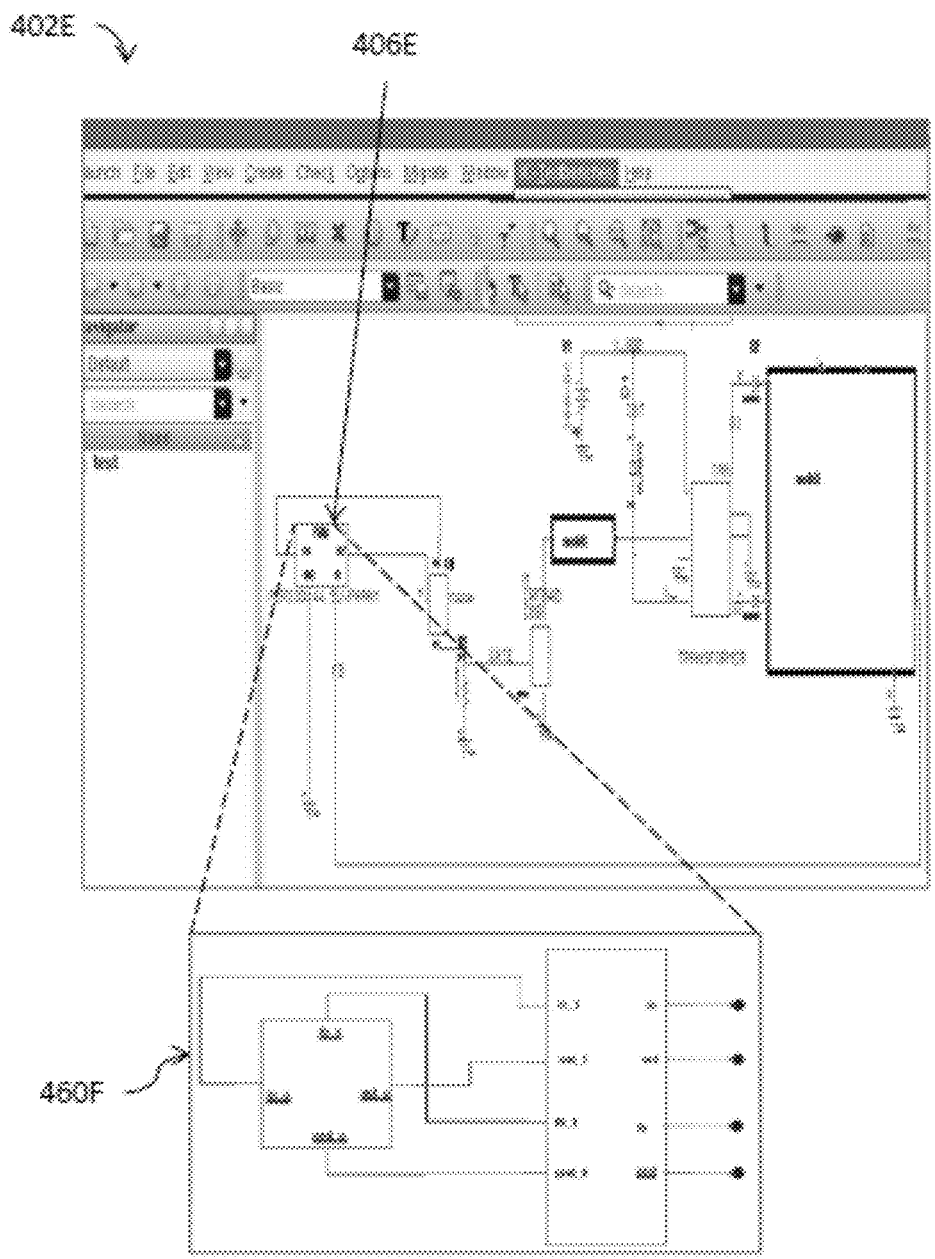

FIG. 4G illustrates the accommodation of the extracted IC package model 406E as a hierarchy under the simulation schematic 402E as well as the additional hierarchy 460F as another hierarchy under the IC package model 406E in some embodiments. In some other embodiments, the extracted IC package model 460F may be introduced to the simulation schematic 402E as flat circuit components, rather than as a hierarchical structure as illustrated in FIG. 4G.

Figure 4H:
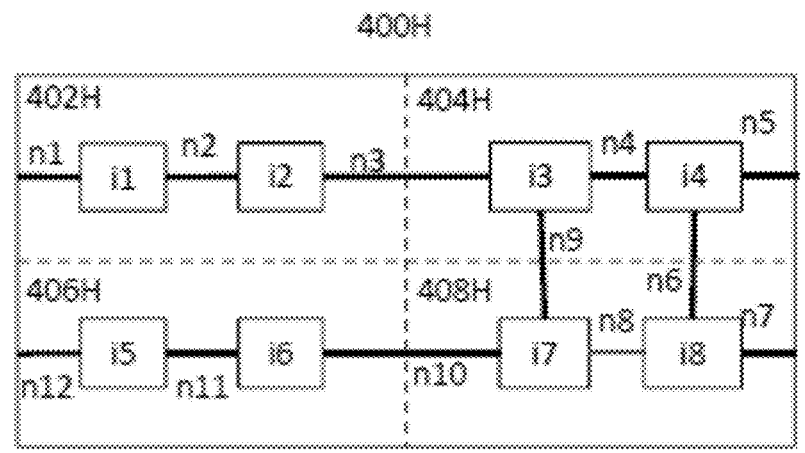

FIG. 4H illustrates an example of a schematic design in one or more embodiments. The schematic design 400H may span across multiple sheets (402H, 404H, 406H, and 408H) and include multiple instances that are interconnected as shown in FIG. 4H. For example, sheet #1 (402H) of the schematic design may include instance "i1" and "i2"; sheet #2 (404H) of the schematic design may include instance "i3" and "i4; sheet #3 (406H) of the schematic design may include instance "i5" and "i6"; and sheet #4 (408H) of the schematic design may include instance "i7" and "i8".

Figure 4I:
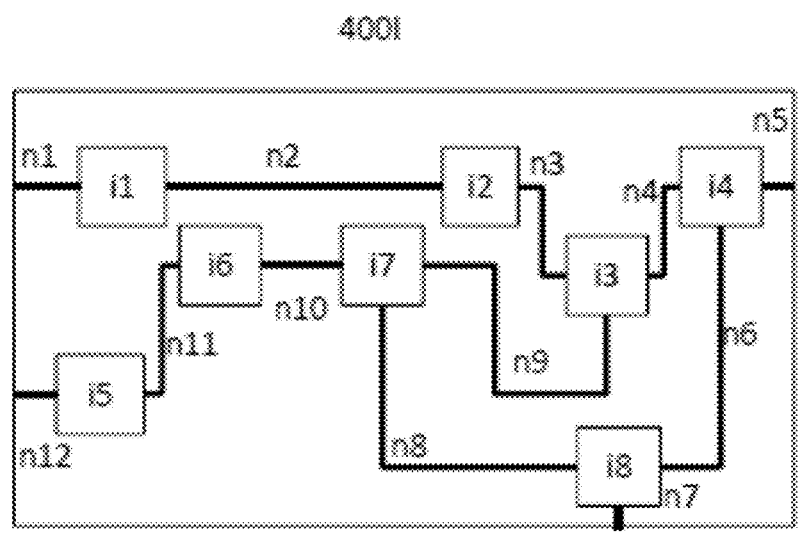

These instances (i1 through i8) are interconnected with a plurality of nets (n1 through n12) as shown in FIG. 4H. For example, instance "i3" is connected to instances "i4", "i7", and "i2" via nets "n4", "n9", and "n3" respectively. FIG. 4I illustrates an example of the corresponding layout for the schematic design illustrated in FIG. 4H. In FIG. 4I, the nets "(n1" through "n12") represent actual, geometric wires or traces in the layout.

Figure 4J:
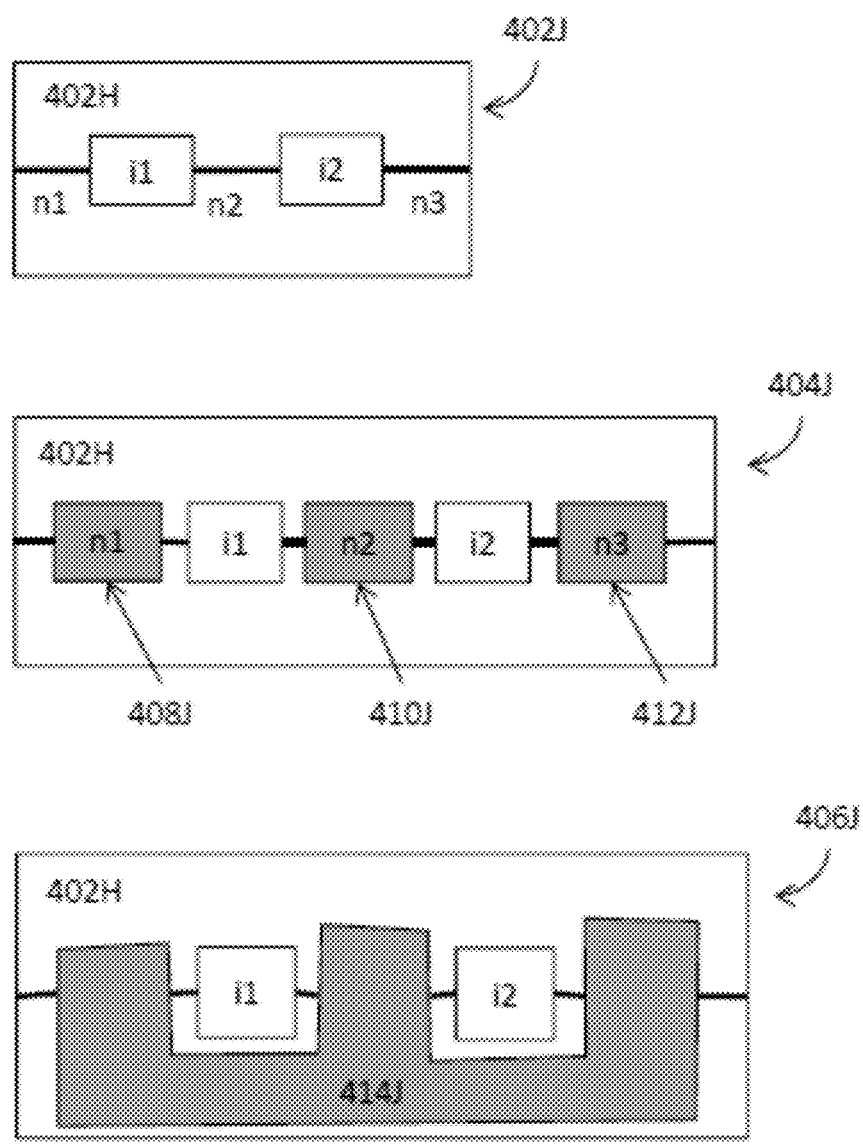

Various techniques describe herein provide the capability for extracting only the nets or segments thereof, only the circuit component designs but not nets, or both the nets and circuit component designs. In addition, the entire design may be extracted and represented in a model (e.g., an s-parameter model) in some embodiments. FIG. 4J illustrates some examples of extracting only the nets or segments thereof for a portion of the electronic design (e.g., sheet #1 402H in FIG. 4H) and representing the portion as one or more extracted models in one or more embodiments.

In these examples illustrated in FIG. 4J, only the nets ("n1", "n2", and "n3" in 402J are extracted and represented as their respective extracted models while the instances ("i1" and "i2") are not represented as extracted models (e.g., no available extracted models for these instances). 404J illustrates an example of representing each extracted circuit component design (the nets in this example) as an extracted model. For example, net "n1" is represented as an extracted model 408J in 404J; net "n2" is represented as an extracted model 410J in 404J; and net "n3" is represented as an extracted model 412J in 404J. 406J illustrates another example of representing all three extracted circuit component designs in a single extracted model, where the three nets ("n1", "n2", and "n3") are represented as a single model 414J (e.g., an s-parameter model) that connects to both instances "i1" and "i2".

FIG. 4K illustrates some examples of extracting only the instances but not the nets or segments thereof for a portion of the electronic design (e.g., sheet #1 402H in FIG. 4H) and representing the portion with one or more extracted models in one or more embodiments. In these examples illustrated in FIG. 4K, only the instances ("i1" and "i2") in 402K are extracted and represented in one or more extracted models, but the nets ("n1", "n2", and "n3" in 402J) are not. 404K illustrates an example of representing each extracted circuit component design (the instances in this example) as an extracted model. In 404K, instance "i1" is represented as an extracted model 408K in 404K; and instance "i2" is represented as an extracted model 410K in 404K. 406K illustrates another example of representing both extracted circuit component designs in a single extracted model, where both instances ("i1" and "i2") are represented as a single model 412K (e.g., an s-parameter model) that connects to all three nets "n1", "n2", and "n3".

Figure 4L:
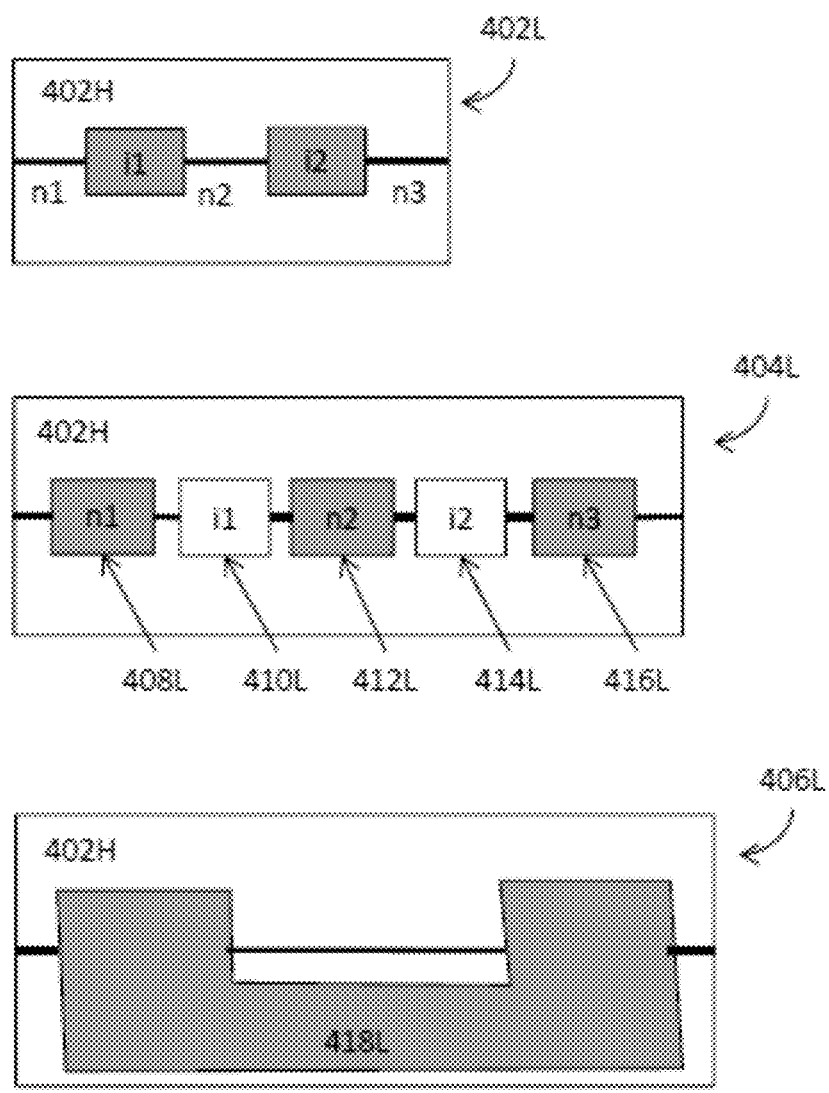

FIG. 4L illustrates some examples of extracting both the instances and the nets or segments thereof for a portion of the electronic design (e.g., sheet #1 402H in FIG. 4H) and representing the portion with one or more extracted models in one or more embodiments. In these examples illustrated in FIG. 4L, both the instances ("i1" and "i2") and the nets ("n1", "n2", and "n3") in 402L are extracted and represented in one or more extracted models. 404L illustrates an example of representing each extracted circuit component design (the instances in this example) as an extracted model.

For example, instance "i1" is represented as an extracted model 410L in 404L; and instance "i2" is represented as an extracted model 414L in 404L; net "n1" is represented as an extracted model 408L in 404L; net "n2" is represented as an extracted model 412L in 404L; and net "n3" is represented as an extracted model 416L in 404L. 406L illustrates another example of representing all the extracted circuit component designs in a single extracted model, where both instances ("i1" and "i2") and all three nets ("n1", "n2", and "n3") are jointly represented as a single model 418L (e.g., an s-parameter model). These examples illustrated in FIGS. 4H-L demonstrate the flexibility in the extraction and representation of circuit component designs with one or more extracted models.

In some other embodiments, a single component design with the one or more associated nets or segments thereof may be extracted and represented in a model. In addition or in the alternative, cross-coupling effects between nets may be accounted for in the model representing the electronic design or a portion thereof. For example, the electromagnetic coupling effects between the nets "n2" and "n10" may be accommodated in the model representing at least instance "i1" or "i2", the model representing instance "i6" or "i7", or in the model representing at least one of instances "i1" and instance "i2" and at least one of instances "i6" and "i7".

Figure 5:
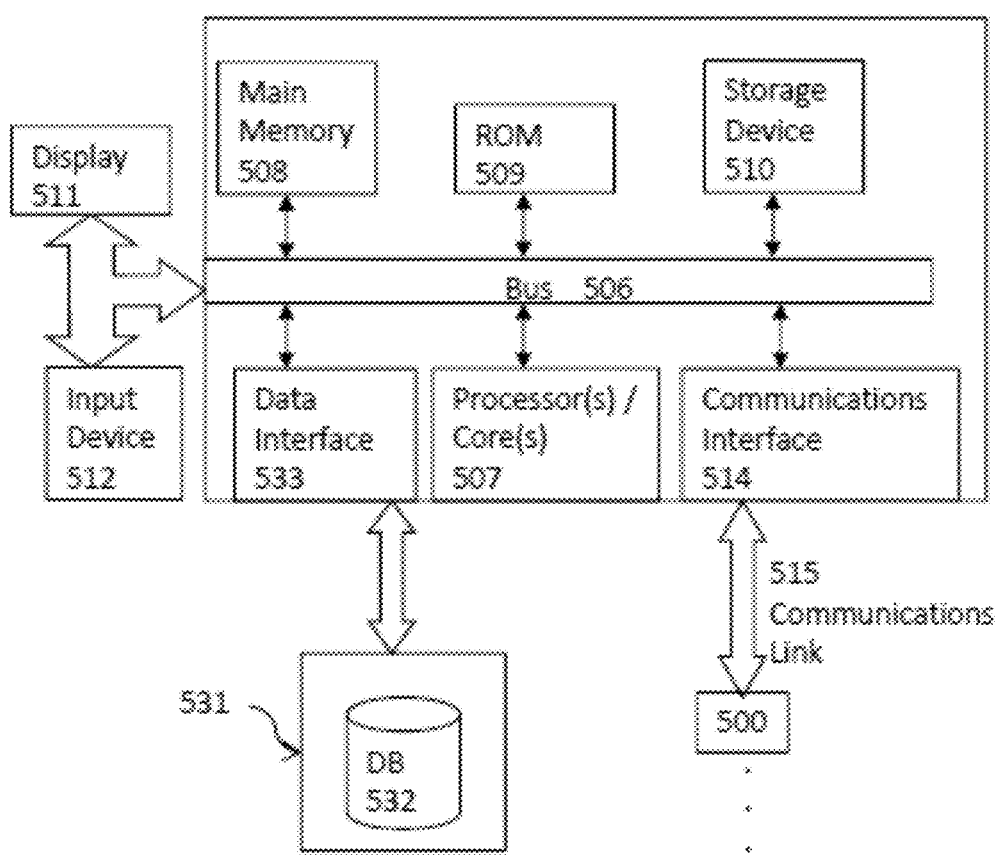
FIG. 5 illustrates a diagram consistent with one or more embodiments of the schematic generation process described herein.

FIG. 5 illustrates a block diagram of an illustrative computing system 500 suitable for constructing a simulation schematic of an electronic design across multiple design fabrics as described in the preceding paragraphs with reference to various figures. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514. It also should be appreciated that the computer system 500 may be extended to a cloud-based computing system.

Figure 6:
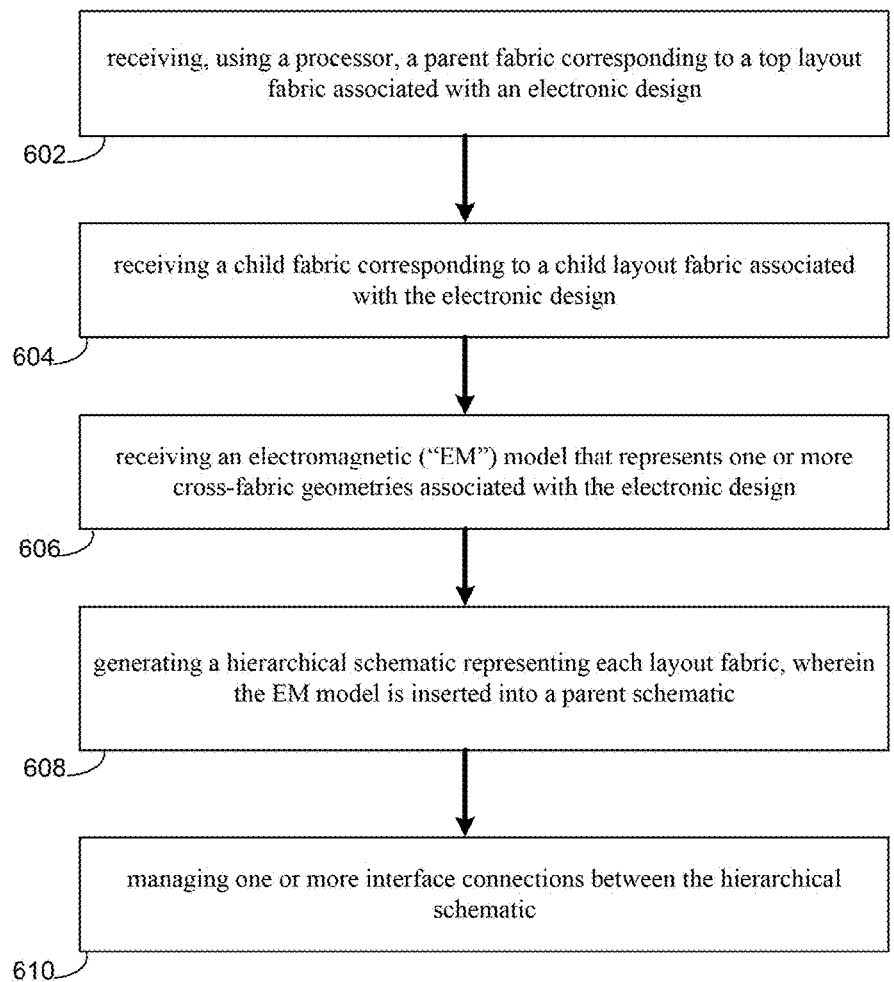
FIG. 6 illustrates a flowchart of operations consistent with one or more embodiments of the schematic generation process described herein.

Referring now to FIG. 6, an embodiment depicting a schematic generation process 600 for use in an electronic design environment is provided. The method may include receiving (602), using a processor, a parent fabric corresponding to a top layout fabric associated with an electronic design and receiving (604) a child fabric corresponding to a child layout fabric associated with the electronic design. The method may further include receiving (606) an electromagnetic ("EM") model that represents one or more cross-fabric geometries associated with the electronic design and generating (608) a hierarchical schematic representing each layout fabric, wherein the EM model is inserted into a parent schematic. The method may also include managing (610) one or more interface connections between the hierarchical schematic.

As used herein, the phrase "CFDE" may refer to a cross-fabric design environment. "CFDE schematic" may refer to a schematic generated from a layout by reading its connectivity and the models of layout traces. "EM-Solver" may refer to an electromagnetic solver that reads geometry and creates electrical model for same as s-parameter or spice file. "Fabric" may refer to a layout made on a substrate. For example, it could be Silicon fabric for IC-layout, ceramic substrate for package-layout, FR4 (Formica) for PCB-substrate, etc.

Embodiments of the schematic generation process included herein may provide a method of generating a single hierarchical schematic from multiple layouts with instance in parent fabric schematic calling the child-fabric schematic. Embodiments of the schematic generation process included herein may also provide a method of stitching a cross-fabric model in the parent fabric schematic and adjusting the interfaces accordingly to keep the interface connections of parent-child schematics.

Figure 7:
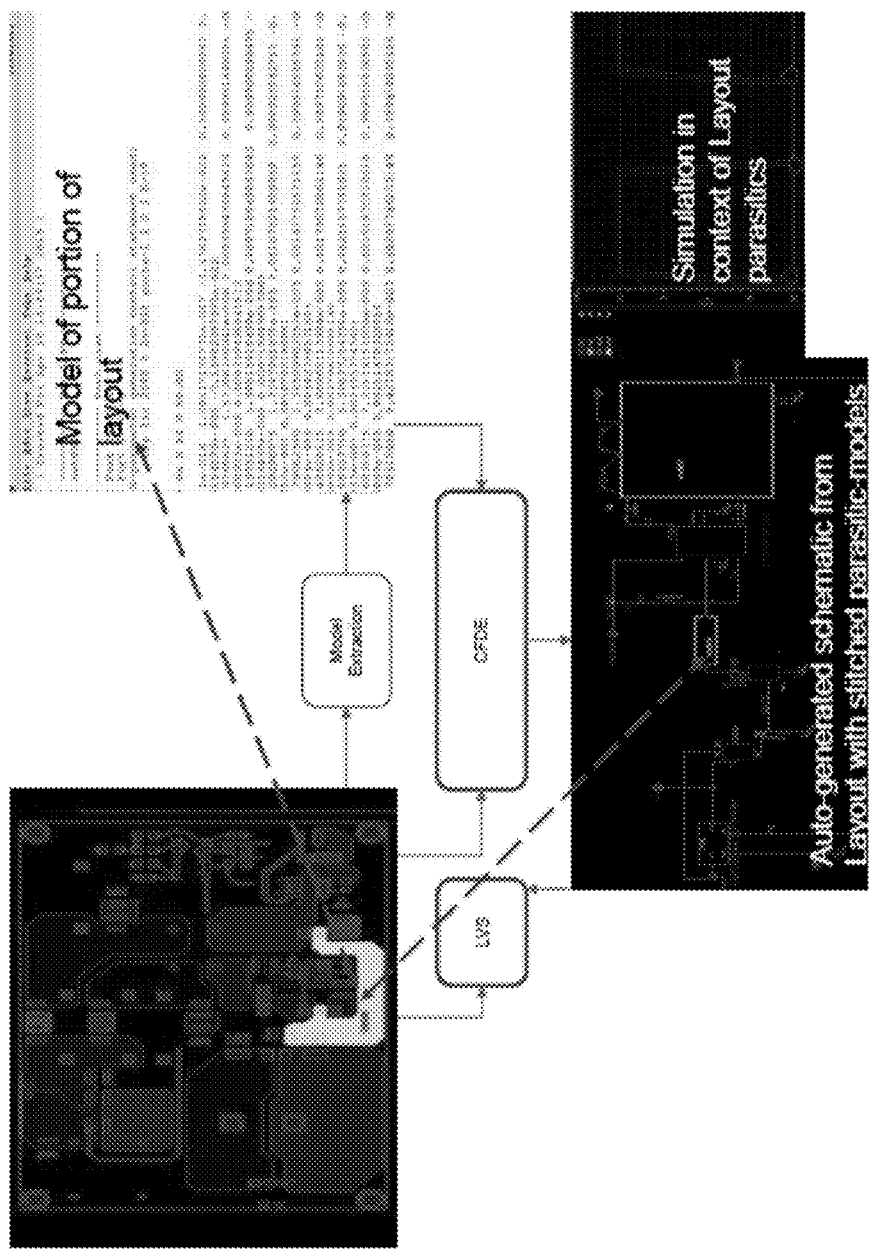
FIG. 7 illustrates a diagram consistent with one or more embodiments of the schematic generation process described herein.

Referring now to FIG. 7, an embodiment depicting a method to build simulation schematics from multiple layout fabrics that constitute a system design is provided. However, an issue remains regarding how to stitch a cross-fabric EM-model into schematics where each schematic represents a different fabric. In order to capture coupling effects, an element on a layout fabric should be EM-extracted in conjunction with other layout-fabrics that surround this fabric. An EM-model extracted from a multi-fabric combined geometry needs to be stitched to all fabric schematics such that all schematics can connect to the common multi-fabric model. When a common multi-fabric EM-model stitches into multiple schematics, it is important that the devices that are part of the EM-model get removed from the schematic to avoid double-counting.

In existing systems, this process is manual and tedious in nature. A new schematic is built that houses the content of different fabric-schematics. A multi-fabric EM-model is stitched/inserted by abutting the schematic-portions that are represented by the inserted-model. This is time consuming and error prone especially if the model runs into 100 of ports. Moreover, this schematic is usually a flat schematic representing all the fabrics so that the model that crosses fabric boundaries can be stitched.

In the current CFDE approach, a CFDE flow may read the layout and models for each fabric (independent of other fabrics) and create a respective schematic. However, this approach supports models that are extracted out of single fabric geometry, ignoring the coupling effects with respect to geometries on other fabrics.

Figure 8:
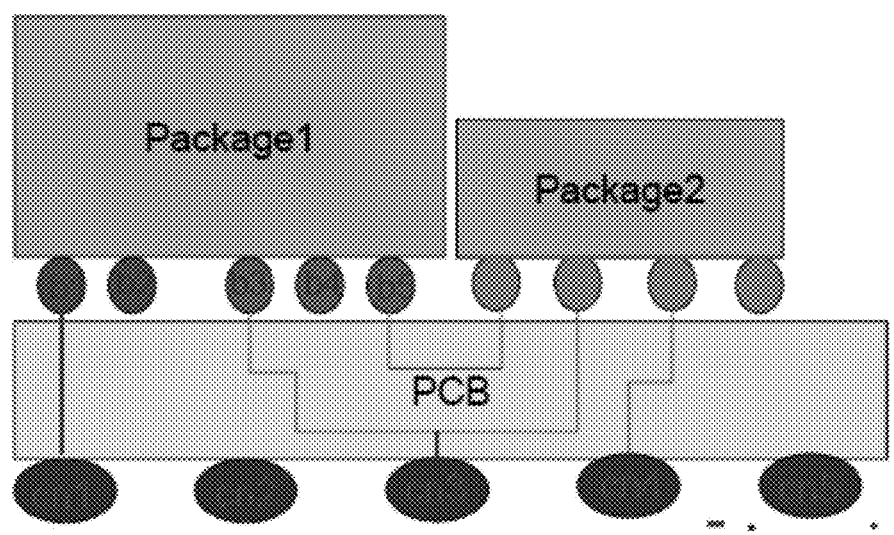
FIG. 8 illustrates a diagram consistent with one or more embodiments of the schematic generation process described herein.

Referring now to FIG. 8, an embodiment for creating fabric-schematics using respective layouts and combined multi-fabric model is provided. As used herein, the term "parent fabric" may refer to a main substrate (PCB in this case) housing child fabrics connected to each other through traces on mother substrate. The term "child fabric" may refer one or more substrates (package1 and package2 in this case) sitting on parent fabric.

Figure 9:
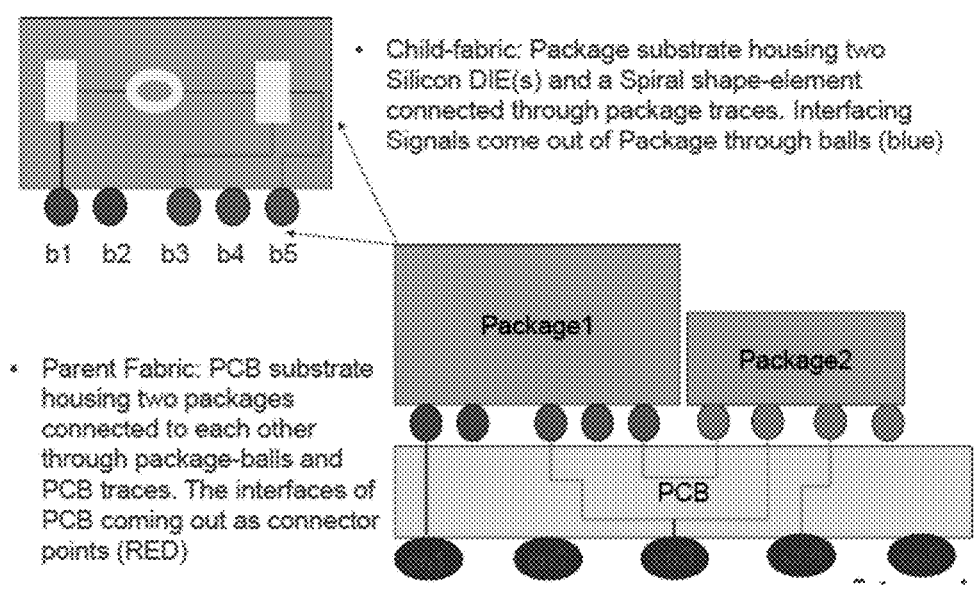
FIG. 9 illustrates a diagram consistent with one or more embodiments of the schematic generation process described herein.

Referring now to FIG. 9, another embodiment for creating fabric-schematics using respective layouts and combined a multi-fabric model is provided. In this particular example, the Child-fabric may include a package substrate housing two Silicon DIE(s) and a Spiral shape-element connected through package traces. Interfacing Signals come out of Package through balls (blue). The Parent Fabric may include a PCB substrate housing two packages connected to each other through package-balls and PCB traces. The interfaces of PCB coming out as connector points (RED).

Figure 10:
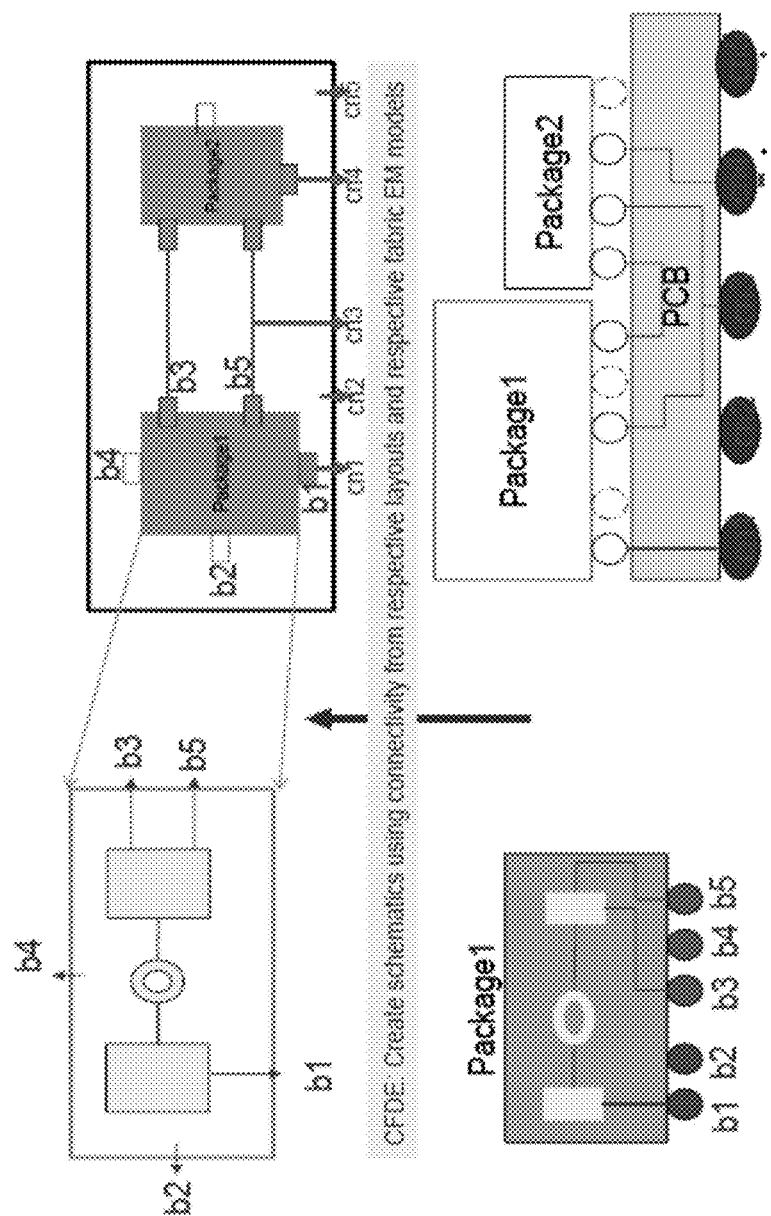
FIG. 10 illustrates a diagram consistent with one or more embodiments of the schematic generation process described herein.
Figure 11:
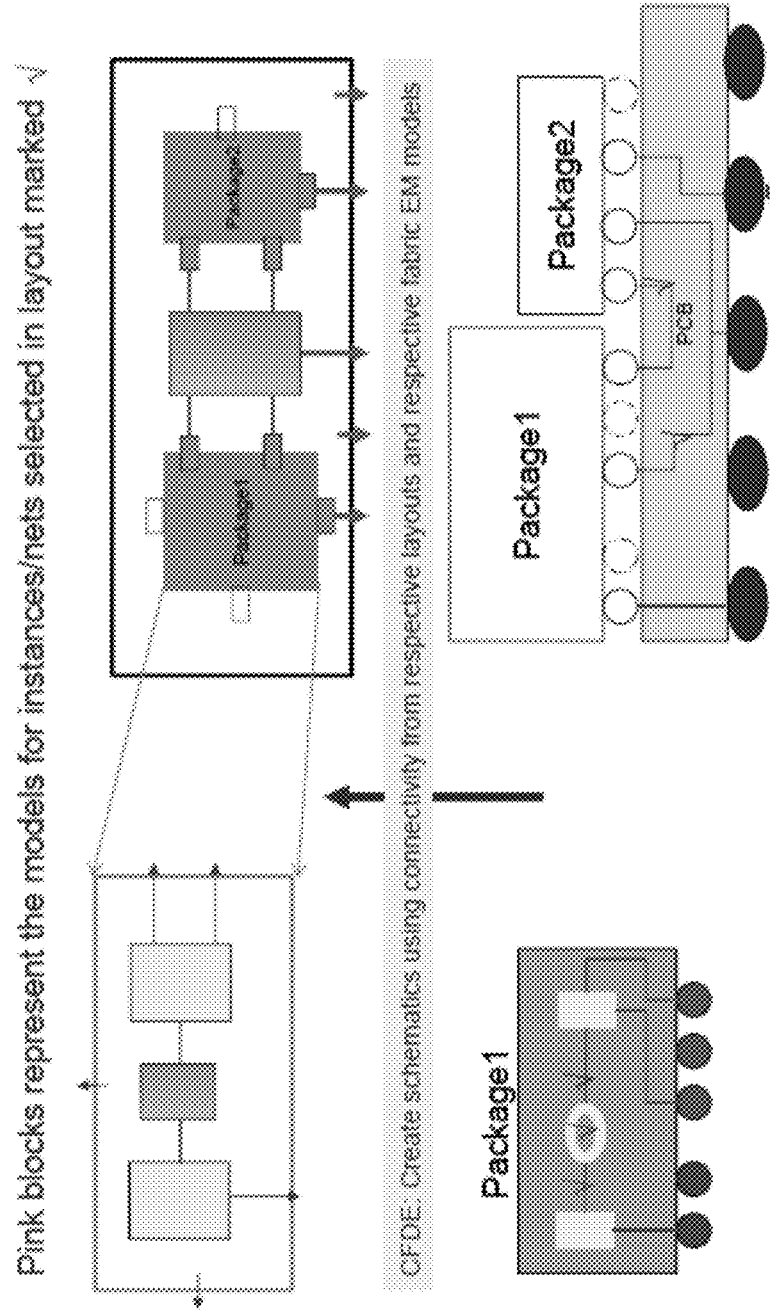
FIG. 11 illustrates a diagram consistent with one or more embodiments of the schematic generation process described herein.
Figure 12:
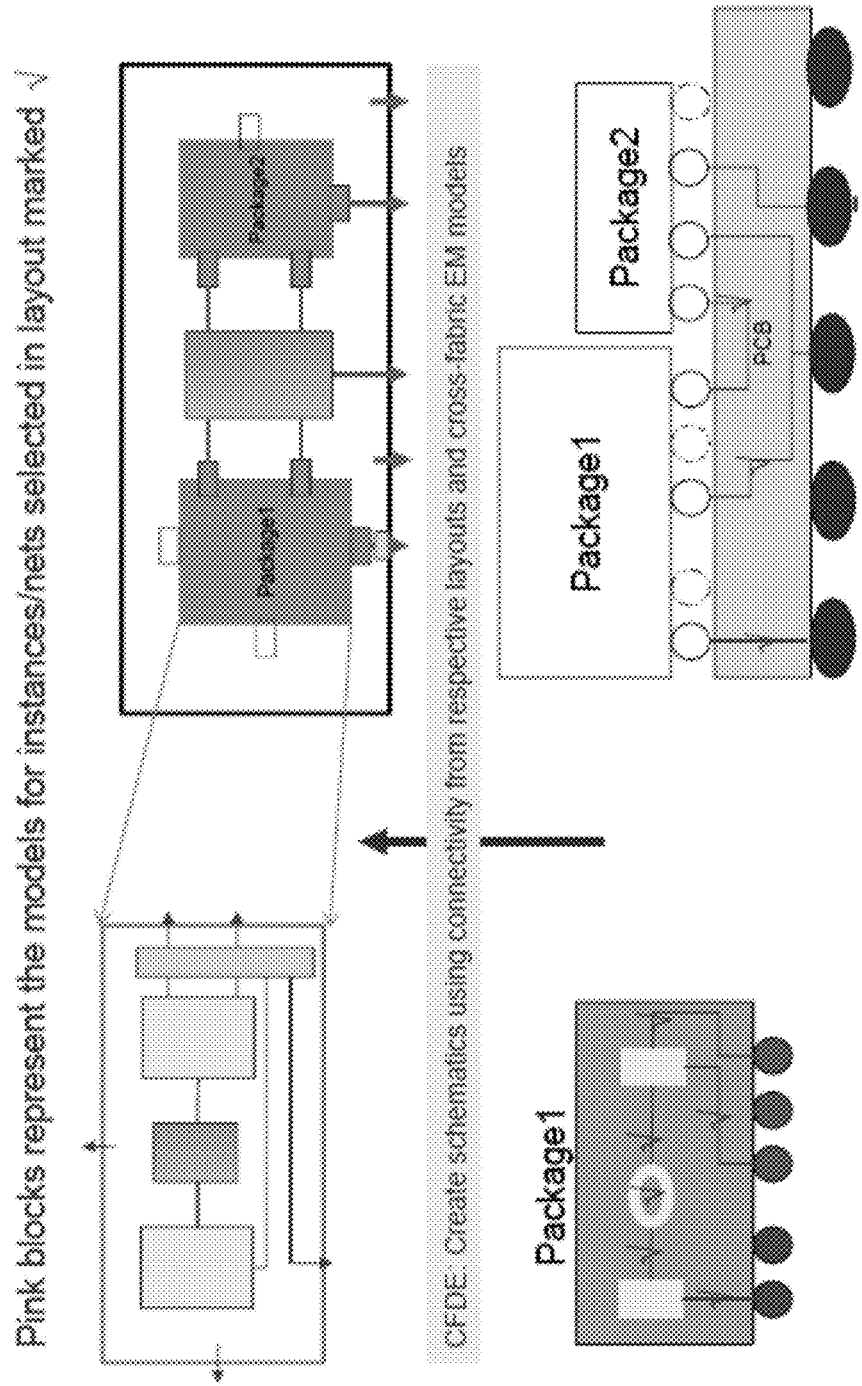
FIG. 12 illustrates a diagram consistent with one or more embodiments of the schematic generation process described herein.

Referring now to FIGS. 10-12, examples depicting the existing CFDE solution are provided. FIG. 10 depicts an example for creating fabric-schematics using respective layouts. FIG. 11 depicts an example for stitching INTERNAL trace/element models in respective fabric schematics. FIG. 12 depicts an example for Stitching INTERFACE-trace-models of layout fabric in respective schematics.

Accordingly, embodiments of schematic generation process may include the automatic construction of hierarchical schematics with a parent owning the EM-model. As such, embodiments included herein propose a method/apparatus where inputs are parent fabric (top layout fabric) and child fabric (child layout) and the EM-model that represents geometries that are cross-fabric. Outputs are hierarchical schematics (top-level parent and sub-level child-representing each layout) with EM-model inserted into parent schematic and in the process managing the interface connections across two schematics.

Figure 13:
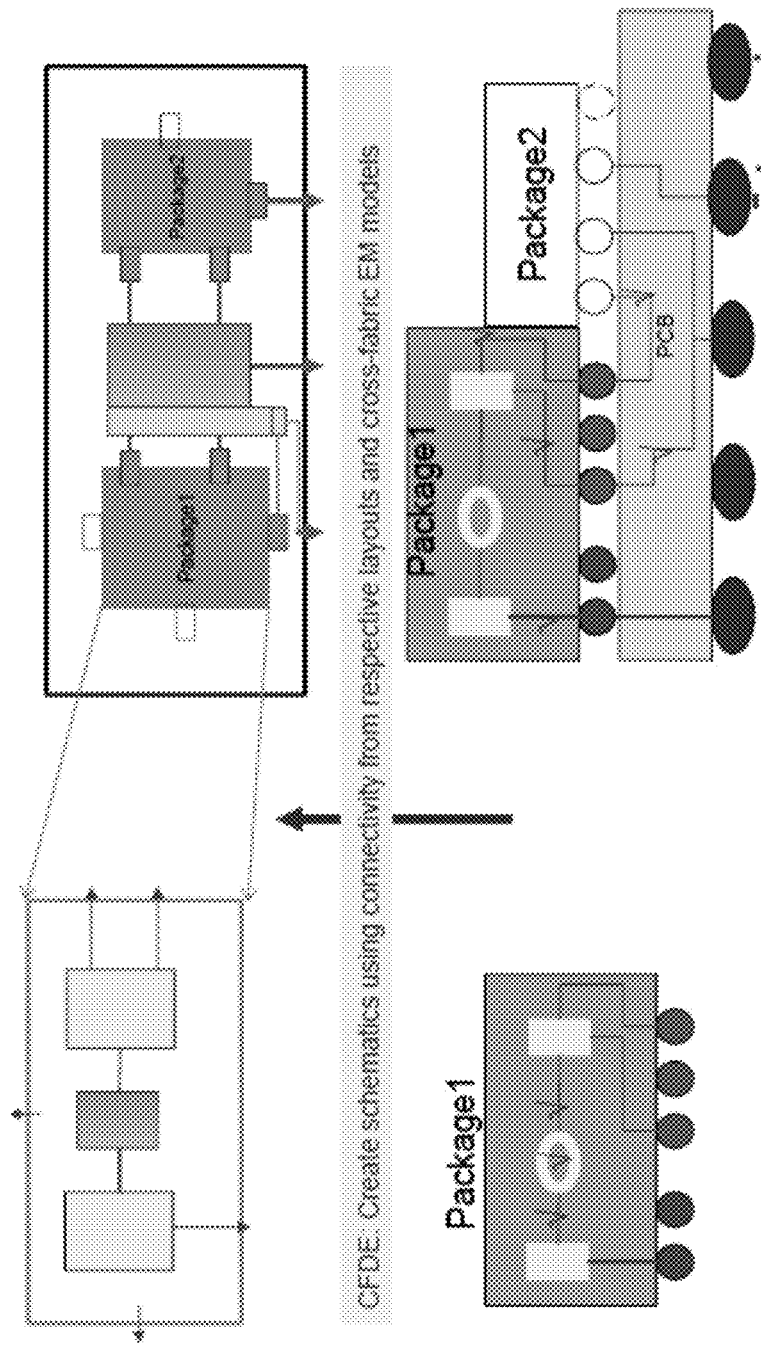
FIG. 13 illustrates a diagram consistent with one or more embodiments of the schematic generation process described herein.

Referring now to FIG. 13, an embodiment of schematic generation process depicting an example when an interface across fabric1 and fabric2 is extracted as combined geometry model. This may include stitching a cross-fabric model in a parent-fabric schematic.

Figure 14:
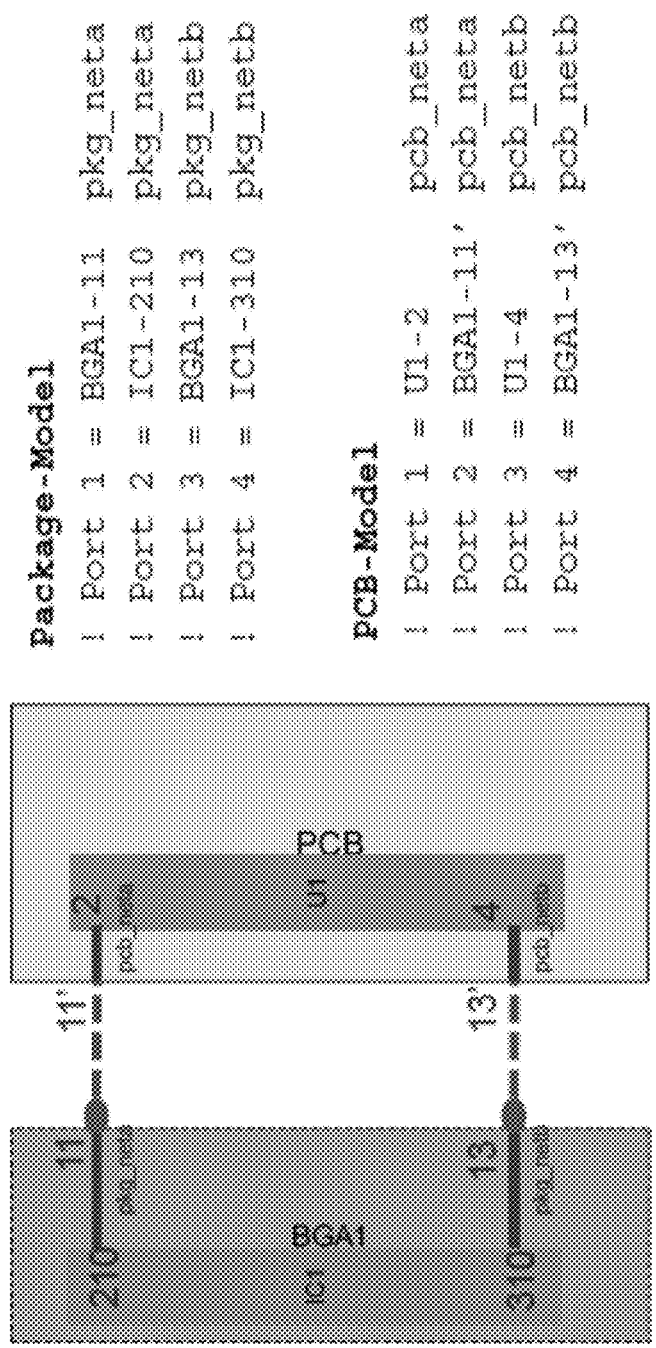
FIG. 14 illustrates a diagram consistent with one or more embodiments of the schematic generation process described herein.

Referring now to FIG. 14, an embodiment of schematic generation process depicting an example of connections in a model-header for CFDE import. For example, when a Package-model (child) is extracted independent of PCB (parent) fabric.

Figure 15:
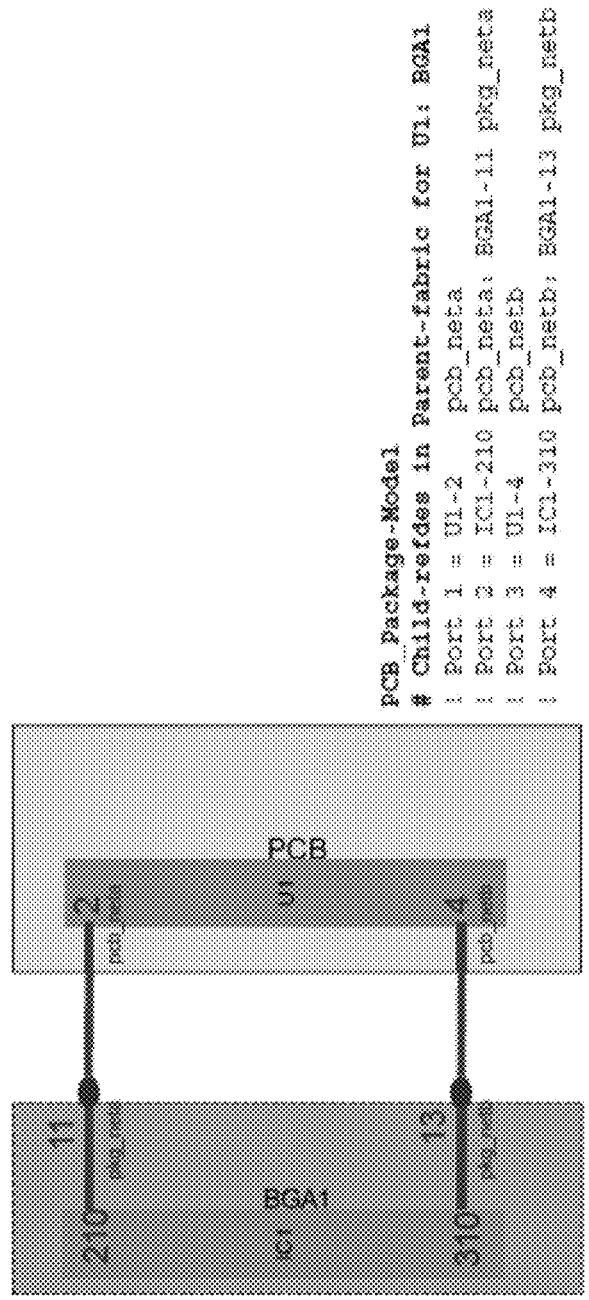
FIG. 15 illustrates a diagram consistent with one or more embodiments of the schematic generation process described herein.

Referring now to FIG. 15, an embodiment of schematic generation process depicting an example of connections in a model-header for CFDE import. For example, when Package-model (child) is extracted in conjunction with PCB (parent) fabric—interface nets.

Figure 16:
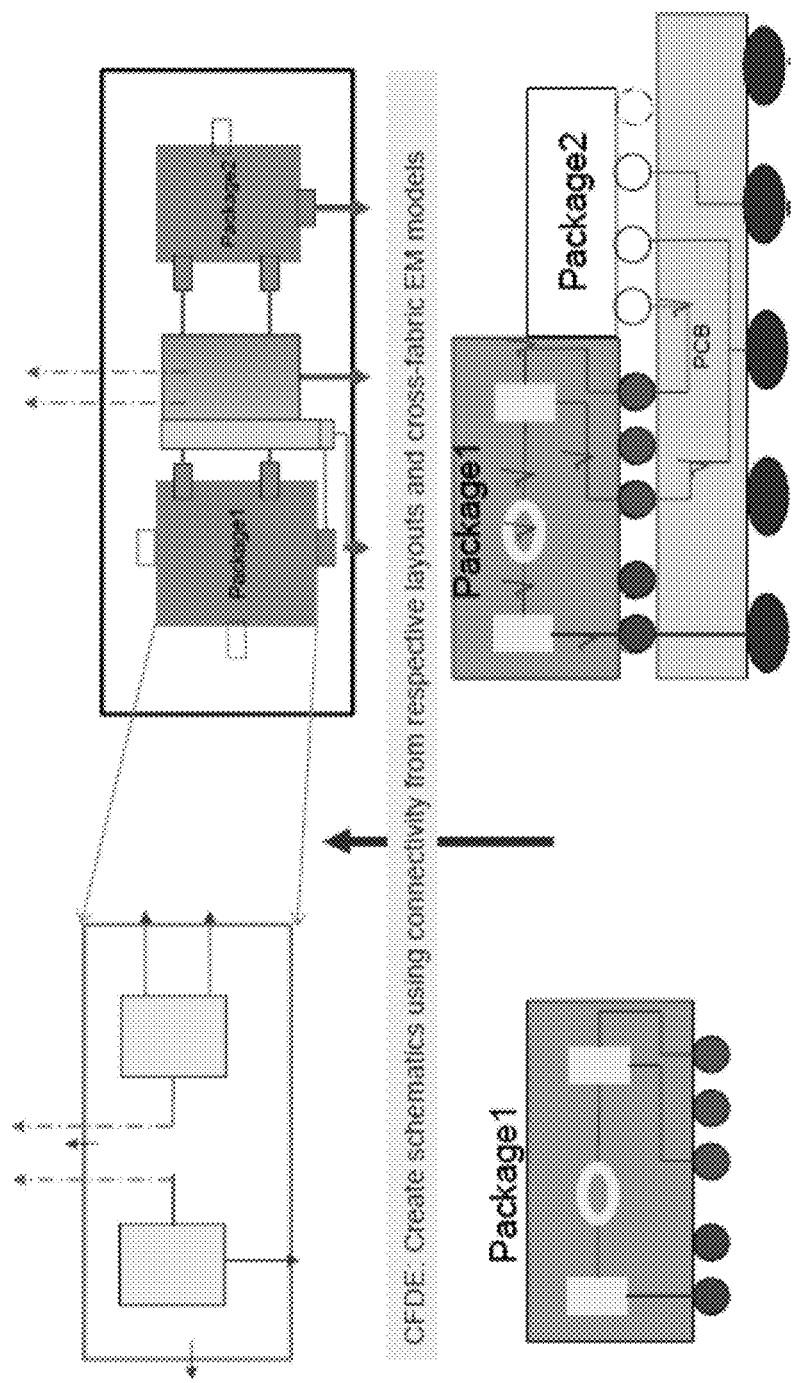
FIG. 16 illustrates a diagram consistent with one or more embodiments of the schematic generation process described herein.
Figure 17:
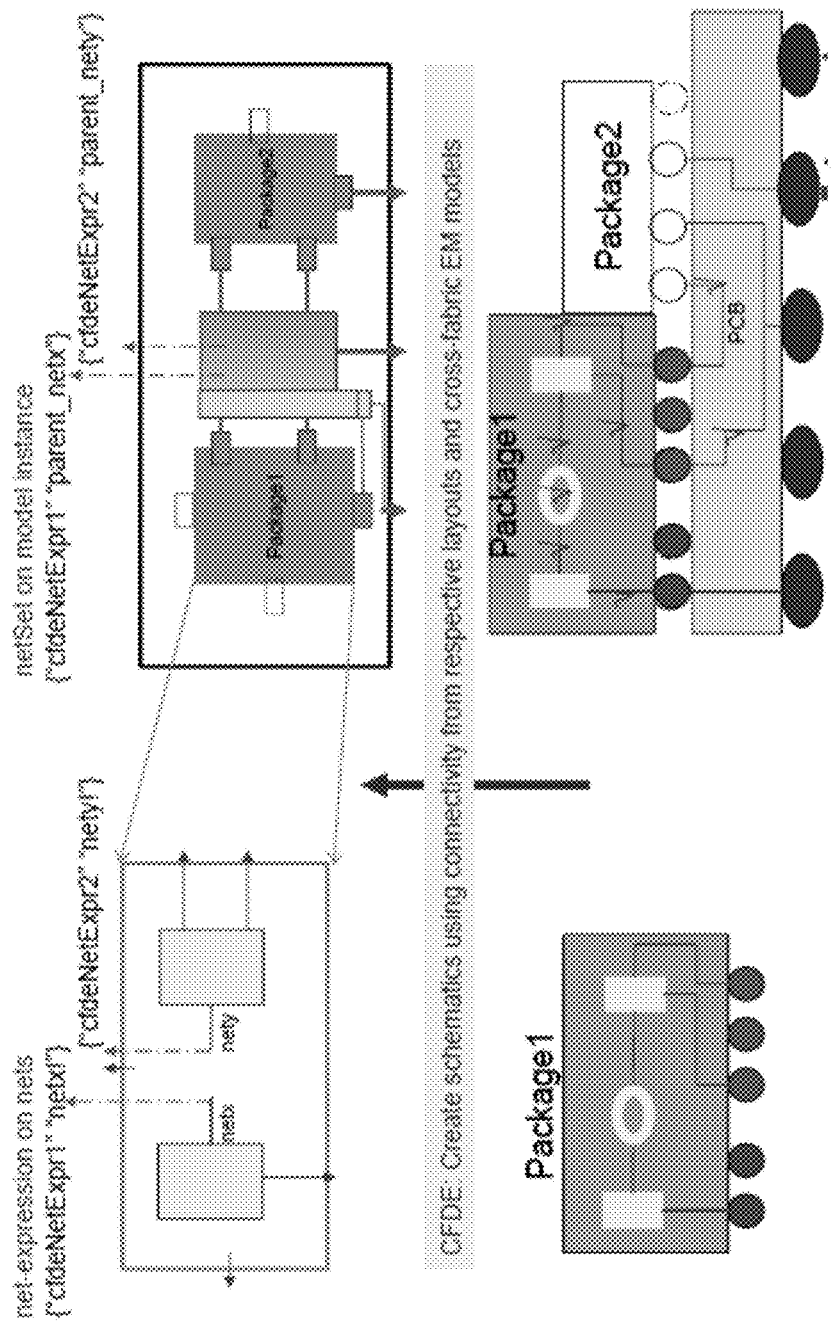
FIG. 17 illustrates a diagram consistent with one or more embodiments of the schematic generation process described herein.

Referring now to FIG. 16-17, an embodiment of schematic generation process depicting an example when an internal-element in fabric1 is extracted in context of fabric2 as a combined geometry model. This may include stitching a cross-fabric model in a parent-fabric schematic.

Figure 18:
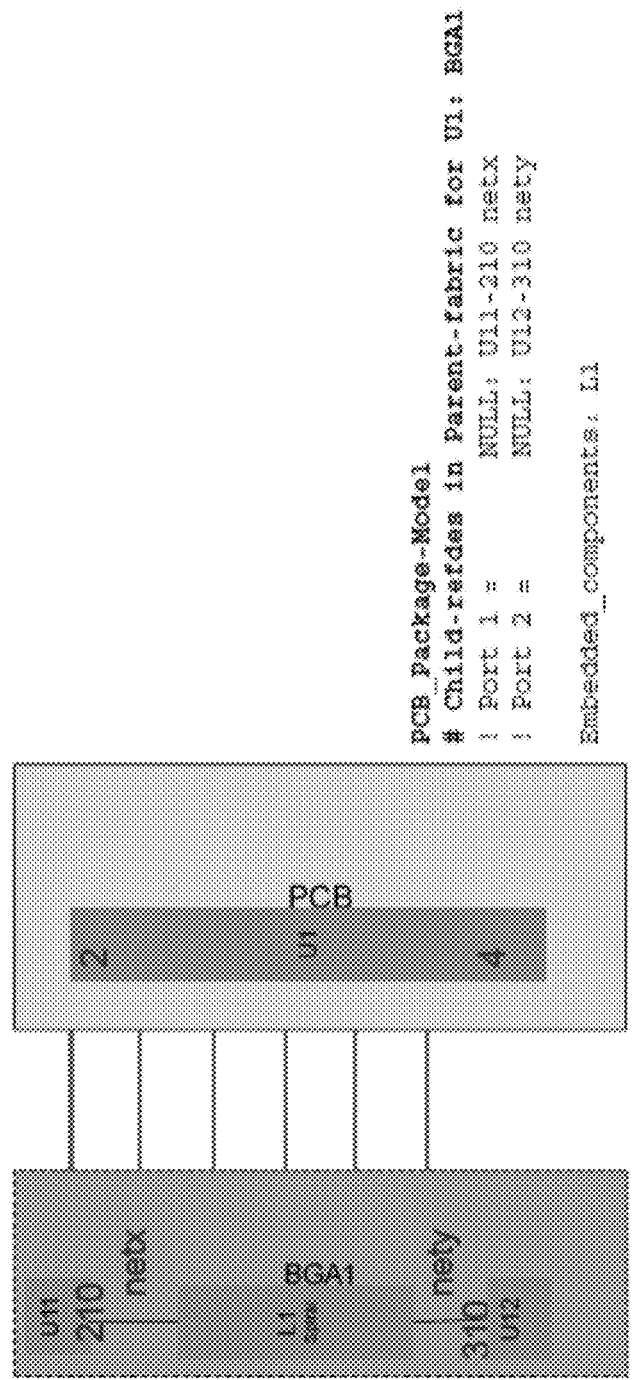
FIG. 18 illustrates a diagram consistent with one or more embodiments of the schematic generation process described herein.
Figure 19:
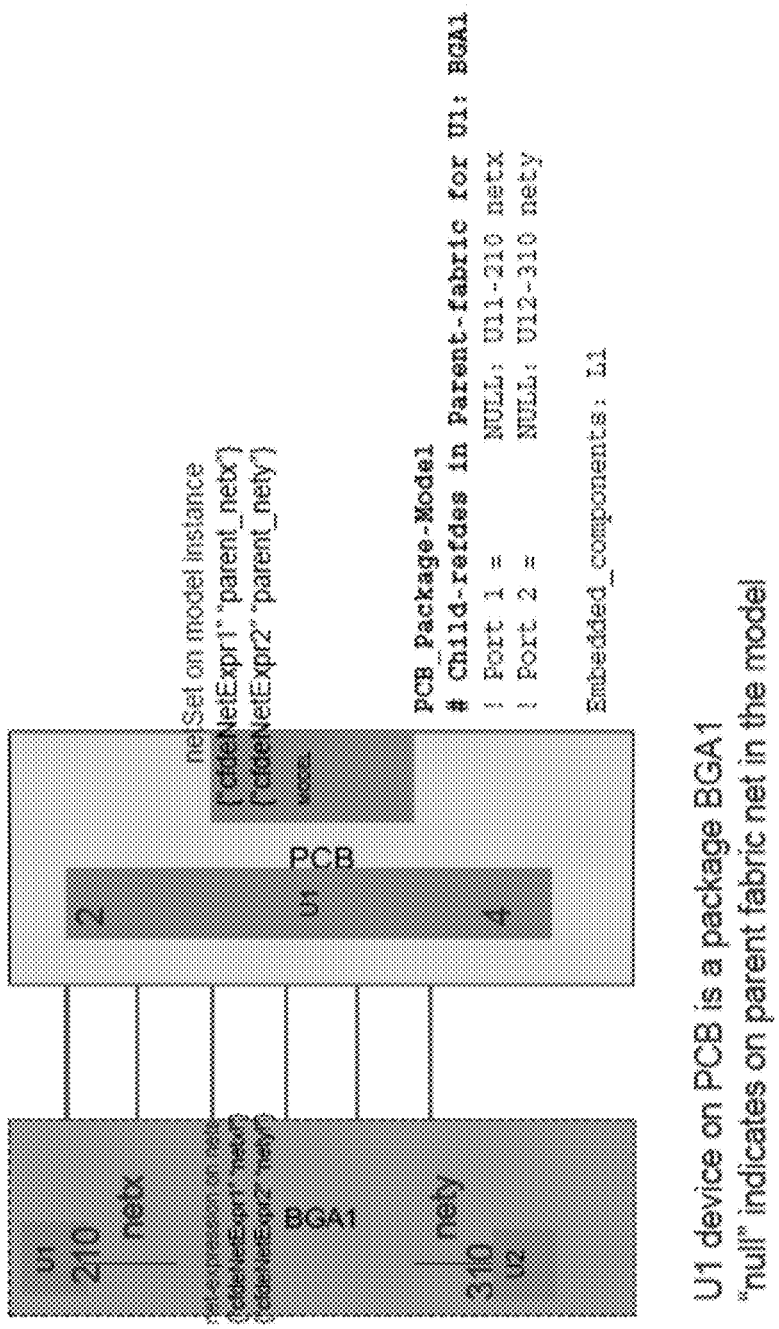
FIG. 19 illustrates a diagram consistent with one or more embodiments of the schematic generation process described herein.

Referring now to FIG. 18-19, an embodiment of schematic generation process depicting an example showing connections in a model-header for CFDE import. This particular example shows when a Package-model (child) is extracted in conjunction with PCB (parent) fabric—internal nets.

As discussed above, embodiments of schematic generation process may be configured to generate a single hierarchical schematic from multiple layouts. For example, with instance in parent fabric schematic calling the child-fabric schematic. Embodiments of schematic generation process may also be configured to stitch a cross-fabric model in the parent fabric schematic and adjust the interfaces accordingly to keep the interface connections of parent-child schematics.

In some embodiments, schematic generation process may receive a number of CFDE-Import inputs. Some of these may include, but are not limited to, layout of Parent-fabric, models of Parent-fabric, cross-fabric models, layouts of Child-fabrics, models of Child-fabrics, etc. Additionally and/or alternatively, schematic generation process may include reading parent fabric layout and extracting connectivity as well as reading the child fabric layout and extracting connectivity.

In some embodiments, and as shown in FIG. 20, schematic generation process may further include reading the cross-fabric EM-model. This may include identifying the parent nets to be used for abutting nets in parent schematic (see FIG. 20). Identifying the child nets to be used for abutting nets in child schematic (see FIG. 21). Identifying the parent instance mapping to Child refdes (see FIG. 22). Identifying embedded components (see FIG. 23) and/or identifying the parent nets that are shorted to Child nets because they are interfaces (see FIG. 24).

Figure 25:
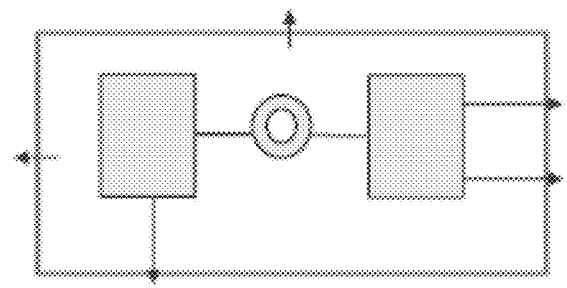
FIG. 25 illustrates a diagram consistent with one or more embodiments of the schematic generation process described herein.
Figure 25:
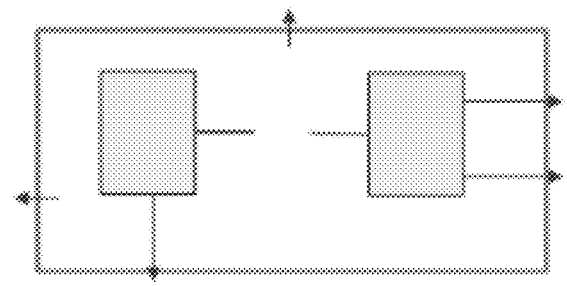
Figure 25:
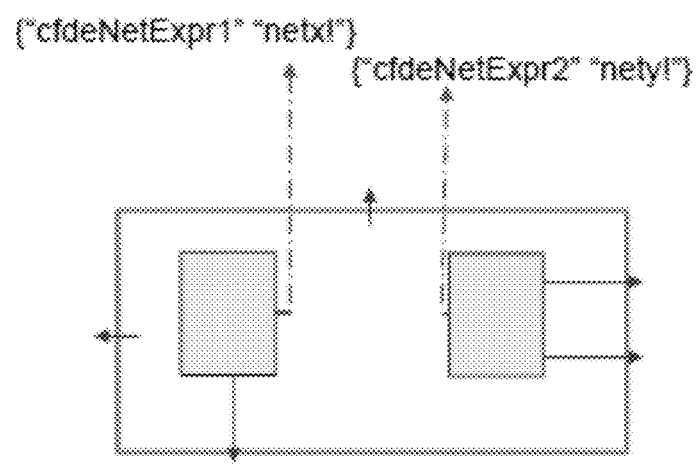

Referring now to FIG. 25, an embodiment of schematic generation process depicting the modification of a child fabric schematic is shown. Accordingly, all embedded components may be removed. Embodiments may further include abutting the internal child-nets, for example, assigning net-expressions to abutted nets to connect to top level schematic. The interface nets may be left as is.

Figure 26:
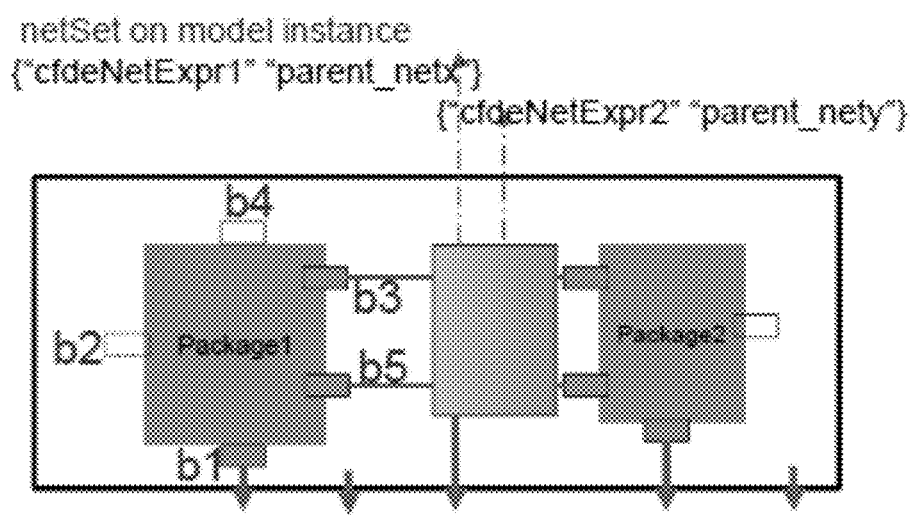
FIG. 26 illustrates a diagram consistent with one or more embodiments of the schematic generation process described herein.

Referring now to FIG. 26, an embodiment of schematic generation process depicting the modification of a parent fabric schematic by importing an EM-model is provided. In some embodiments, this may include stitching the EM-model by abutting the parent-nets for interface nets, stitching the EM-model by assigning NetSets to instance of model for internal nets, and/or removing embedded components.

Figure 27:
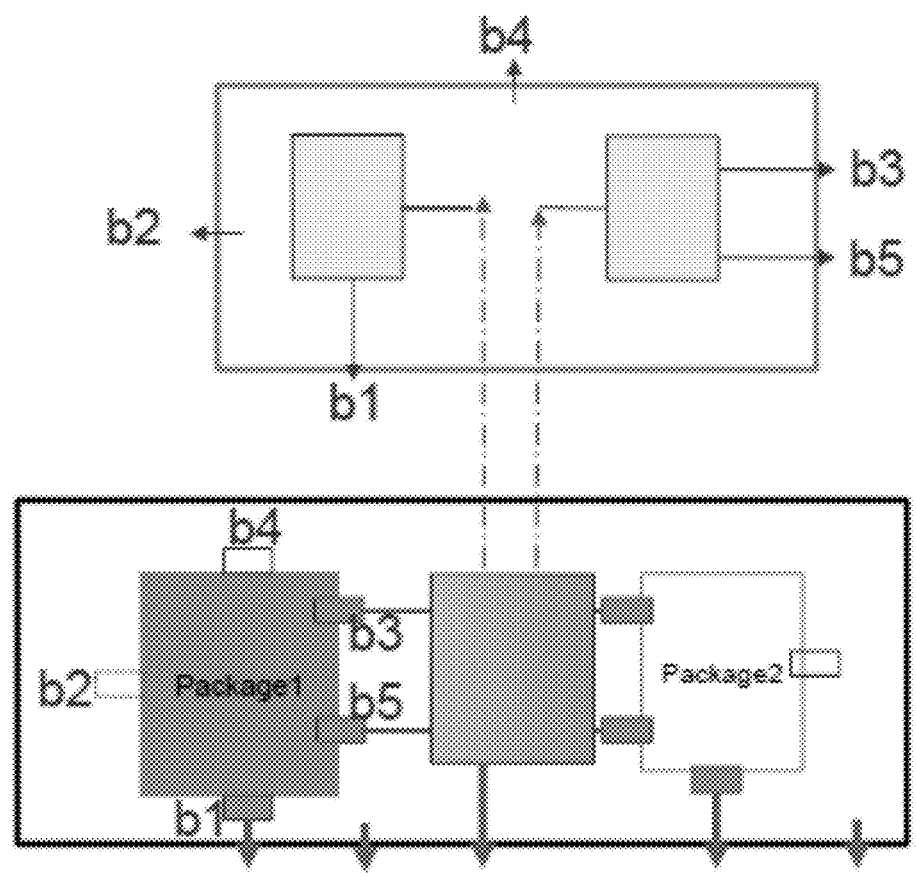
FIG. 27 illustrates a diagram consistent with one or more embodiments of the schematic generation process described herein.

Referring also to FIG. 27, an embodiment of schematic generation process that is configured to allow a user to map child schematic interfaces to pins of the corresponding instance in parent schematic. This may include auto-seed mapping through interface mapping information in a header.

Embodiments of schematic generation process may generate a number of different outputs. Some of these may include, but are not limited to, creating a parent schematic from parent's layout-connectivity, creating a child schematic from child's layout-connectivity, creating a symbol for child schematic, opening a Parent-Child binding form to stitch schematics. This may include seeding a binding map-file for schematic stitching using information from cross-fabric model.

Accordingly, the teachings of the present disclosure may allow for the whole process of creating a system-simulation-schematic from multiple layouts and common cross-fabric model across different fabrics (e.g., silicon, package, board) in just a few hours as opposed to days of manual work. The hierarchical nature of schematics stays intact and yet is able to stitch the cross-fabric model. The top-level schematic may represent the Parent fabric and instantiates Low-level schematic representing Child fabric.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for use in an electronic design environment comprising:

receiving, using a processor, a parent fabric corresponding to a top layout fabric associated with an electronic design;

receiving a child fabric corresponding to a child layout fabric associated with the electronic design;

receiving an electromagnetic ("EM") model that represents one or more cross-fabric geometries associated with the electronic design;

generating a single hierarchical schematic representing both the top layout fabric and the child layout fabric, wherein the EM model is inserted into the top layout fabric; and managing one or more interface connections between the hierarchical schematic.

2. The computer-implemented method of claim 1 wherein the parent fabric is a printed-circuit board ("PCB").

3. The computer-implemented method of claim 1 wherein the child fabric is a package model.

4. The computer-implemented method of claim 1 wherein generating the hierarchical schematic includes reading the top layout fabric and the child layout fabric to determine connectivity data associated with each and one or more models of layout traces.

5. The computer-implemented method of claim 1 further comprising:

reading the EM model, wherein reading the EM model includes identifying one or more parent nets to be used for abutting nets in the parent schematic.

6. The computer-implemented method of claim 5 wherein reading the EM model further includes identifying one or more child nets to be used for abutting nets in a child schematic.

7. The computer-implemented method claim 6 wherein reading the EM model further includes identifying a parent instance mapping to a child reference designator.

8. The computer-implemented method claim 7 wherein reading the EM model further includes identifying the one or more parent nets that are shorted to the one or more child nets as interfaces.

9. A non-transitory computer-readable storage medium having stored thereon instructions that when executed by a machine result in the following operations:

receiving, using a processor, a parent fabric corresponding to a top layout fabric associated with an electronic design;

receiving a child fabric corresponding to a child layout fabric associated with the electronic design;

receiving an electromagnetic ("EM") model that represents one or more cross-fabric geometries associated with the electronic design;

generating a single hierarchical schematic representing both the top layout fabric and the child layout fabric, wherein the EM model is inserted into the top layout fabric; and managing one or more interface connections between the hierarchical schematic.

10. The non-transitory computer-readable storage medium of claim 9 wherein the parent fabric is a printed-circuit board ("PCB").

11. The non-transitory computer-readable storage medium of claim 9 wherein the child fabric is a package model.

12. The non-transitory computer-readable storage medium of claim 9 wherein generating the hierarchical schematic includes reading the top layout fabric and the child layout fabric to determine connectivity data associated with each and one or more models of layout traces.

13. The non-transitory computer-readable storage medium of claim 9 wherein operations further comprise:

reading the EM model, wherein reading the EM model includes identifying one or more parent nets to be used for abutting nets in the parent schematic.

14. The non-transitory computer-readable storage medium of claim 13 wherein reading the EM model further includes identifying one or more child nets to be used for abutting nets in a child schematic.

15. The non-transitory computer-readable storage medium of claim 14 wherein reading the EM model further includes identifying a parent instance mapping to a child reference designator.

16. The non-transitory computer-readable storage medium of claim 15 wherein reading the EM model further includes identifying the one or more parent nets that are shorted to the one or more child nets as interfaces.

17. A system for use in an electronic design environment comprising:

a computing device having at least one processor configured to receive a parent fabric corresponding to a top layout fabric associated with an electronic design, a child fabric corresponding to a child layout fabric associated with the electronic design, and an electromagnetic ("EM") model that represents one or more cross-fabric geometries associated with the electronic design, the at least one processor further configured to generate a single hierarchical schematic representing both the top layout fabric and the child layout fabric, wherein the EM model is inserted into the top layout fabric, the at least one processor further configured to manage one or more interface connections between the hierarchical schematic.

18. The system of claim 17 wherein generating the hierarchical schematic includes reading the top layout fabric and the child layout fabric to determine connectivity data associated with each and one or more models of layout traces.

19. The system of claim 17 further comprising:

at least one processor further configured to read the EM model, wherein reading the EM model includes identifying one or more parent nets to be used for abutting nets in a parent schematic and identifying one or more child nets to be used for abutting nets in a child schematic.

20. The system of claim 19 wherein reading the EM model further includes identifying a parent instance mapping to a child reference designator and identifying the one or more parent nets that are shorted to the one or more child nets as interfaces.

* * * * *